(12) United States Patent
Ramberg et al.

(10) Patent No.: US 8,277,743 B1
(45) Date of Patent: Oct. 2, 2012

(54) SUBSTRATE FABRICATION

(75) Inventors: Charles E. Ramberg, Los Altos Hills, CA (US); Stephen A. Dynan, Boalsburg, PA (US)

(73) Assignee: Errcive, Inc., Boalsburg, PA (US)

( * ) Notice: Subject to any disclaimer, the term of this patent is extended or adjusted under 35 U.S.C. 154(b) by 176 days.

(21) Appl. No.: 12/756,987

(22) Filed: Apr. 8, 2010

Related U.S. Application Data

(60) Provisional application No. 61/167,857, filed on Apr. 8, 2009.

(51) Int. Cl.
*B01J 8/02* (2006.01)
*B01J 35/02* (2006.01)
*B01J 8/00* (2006.01)
*B01J 19/00* (2006.01)

(52) U.S. Cl. ........ 422/211; 422/129; 422/130; 422/600; 422/603

(58) Field of Classification Search .................. 422/129, 422/130, 600, 603, 211
See application file for complete search history.

(56) References Cited

U.S. PATENT DOCUMENTS

| | | |
|---|---|---|
| 293,745 A | 2/1884 | Hyatt |
| 1,852,489 A | 4/1932 | Sullivan |
| 2,449,822 A | 9/1948 | Schibbye |
| 2,544,752 A | 3/1951 | Gelbman |
| 2,892,240 A | 6/1959 | Frankenhoff |
| 2,926,137 A | 2/1960 | Calvert |
| 2,946,112 A | 7/1960 | Tucker, Jr. |
| 3,343,680 A | 9/1967 | Rice et al. |
| 3,505,008 A | 4/1970 | Frevel et al. |
| 3,574,530 A | 4/1971 | Suriani et al. |
| 3,704,786 A | 12/1972 | Lerner et al. |
| 3,739,553 A | 6/1973 | Aine |
| 3,824,196 A | 7/1974 | Benbow et al. |
| 3,885,977 A | 5/1975 | Lachman et al. |
| 3,940,301 A | 2/1976 | Straw et al. |
| 3,942,990 A | 3/1976 | Engstrom et al. |
| 3,953,562 A | 4/1976 | Hait et al. |
| 3,953,703 A | 4/1976 | Hurwitt et al. |
| 3,954,672 A | 5/1976 | Somers et al. |
| 3,957,694 A | 5/1976 | Bolon et al. |
| 3,975,201 A | 8/1976 | Greenstein |
| 3,991,149 A | 11/1976 | Hurwitt |
| 4,006,533 A | 2/1977 | Squires |

(Continued)

FOREIGN PATENT DOCUMENTS
EP 0337047 10/1998
(Continued)

OTHER PUBLICATIONS
R-1 Direct Metal Printer product description, ProMetal (Ex-One) downloaded from www.exone.com Mar. 2009.
(Continued)

*Primary Examiner* — Walter D Griffin
*Assistant Examiner* — Natasha Young

(57) ABSTRACT

Systems and methods for fabricating bodies (e.g., porous bodies) are described. Various aspects provide for reactors and the fabrication of reactors. Some reactors include surfaces that provide for heterogeneous reactions involving a fluid (and/or components thereof). A fluid may be a gas and/or a liquid. A contaminant in the fluid (e.g., a dissolved or suspended substance) may react in a reaction. Some reactors provide for independent control of heat transfer (between the fluid, the reactor, and the environment) with respect to mass transfer (e.g., fluid flow through the reactor).

32 Claims, 22 Drawing Sheets

U.S. PATENT DOCUMENTS

| | | | |
|---|---|---|---|
| 4,025,462 A | 5/1977 | Cleveland |
| 4,041,591 A | 8/1977 | Noll et al. |
| 4,041,592 A | 8/1977 | Kelm |
| 4,069,063 A | 1/1978 | Ball |
| 4,071,369 A | 1/1978 | Kurz et al. |
| 4,073,729 A | 2/1978 | Kraemer et al. |
| 4,080,414 A | 3/1978 | Anderson et al. |
| 4,107,013 A | 8/1978 | McGinniss et al. |
| 4,110,187 A | 8/1978 | Sloan et al. |
| 4,120,735 A | 10/1978 | Smith |
| 4,124,864 A | 11/1978 | Greenberg |
| 4,166,037 A | 8/1979 | Montagnon |
| 4,190,533 A | 2/1980 | Hirs |
| 4,191,546 A | 3/1980 | Kroyer |
| 4,197,205 A | 4/1980 | Hirs |
| 4,225,443 A | 9/1980 | Harris et al. |
| 4,253,992 A | 3/1981 | Soejima et al. |
| 4,254,616 A | 3/1981 | Siminski et al. |
| 4,255,166 A | 3/1981 | Gernand et al. |
| 4,264,346 A | 4/1981 | Mann |
| 4,276,062 A | 6/1981 | Lyon et al. |
| 4,276,071 A | 6/1981 | Outland |
| 4,293,514 A | 10/1981 | Wada |
| 4,329,162 A | 5/1982 | Pitcher, Jr. |
| 4,353,854 A | 10/1982 | Oyamada et al. |
| 4,379,039 A | 4/1983 | Fujimoto et al. |
| 4,415,344 A | 11/1983 | Frost et al. |
| 4,416,675 A | 11/1983 | Montierth |
| 4,430,108 A | 2/1984 | Hojaji et al. |
| 4,436,682 A | 3/1984 | Knopp |
| 4,440,867 A | 4/1984 | Sbherwal |
| 4,452,635 A | 6/1984 | Noshi et al. |
| 4,483,944 A | 11/1984 | Day et al. |
| 4,587,068 A | 5/1986 | Borase et al. |
| 4,601,332 A | 7/1986 | Oda et al. |
| 4,613,374 A | 9/1986 | Smith |
| 4,626,359 A | 12/1986 | Bennett et al. |
| 4,629,483 A | 12/1986 | Stanton |
| 4,637,995 A | 1/1987 | DeAngelis et al. |
| 4,645,605 A | 2/1987 | Durham |
| 4,652,411 A | 3/1987 | Swarr et al. |
| 4,681,788 A | 7/1987 | Barito et al. |
| 4,743,382 A | 5/1988 | Williamson et al. |
| 4,747,945 A | 5/1988 | Kreusch et al. |
| 4,777,153 A | 10/1988 | Sonuparlak et al. |
| 4,786,342 A | 11/1988 | Zellner et al. |
| 4,804,521 A | 2/1989 | Rochelle et al. |
| 4,863,538 A | 9/1989 | Deckard |
| 4,871,495 A | 10/1989 | Helferich et al. |
| 4,877,506 A | 10/1989 | Fee et al. |
| 4,883,497 A | 11/1989 | Claar et al. |
| 4,888,054 A | 12/1989 | Pond |
| 4,898,105 A | 2/1990 | Rappoldt et al. |
| 4,898,631 A | 2/1990 | Collins, Jr. |
| 4,944,817 A | 7/1990 | Bourell et al. |
| 4,964,888 A | 10/1990 | Miller |
| 4,968,460 A | 11/1990 | Thompson et al. |
| 4,971,601 A | 11/1990 | Najjar et al. |
| 4,973,459 A | 11/1990 | Lippert et al. |
| 4,976,760 A | 12/1990 | Helferich et al. |
| 5,002,710 A | 3/1991 | Shanefield et al. |
| 5,071,449 A | 12/1991 | Sircar |
| 5,086,093 A | 2/1992 | Miller |
| 5,100,633 A | 3/1992 | Morrison |
| 5,108,614 A | 4/1992 | Ross et al. |
| 5,145,826 A | 9/1992 | Hirschberg et al. |
| 5,203,936 A | 4/1993 | Dolhert et al. |
| 5,204,055 A | 4/1993 | Sachs et al. |
| 5,215,724 A | 6/1993 | Haerle |
| 5,221,484 A | 6/1993 | Goldsmith et al. |
| 5,229,078 A | 7/1993 | Haerle |
| 5,232,955 A | 8/1993 | Csabai et al. |
| 5,238,057 A | 8/1993 | Schelter et al. |
| 5,240,485 A | 8/1993 | Haerle et al. |
| 5,244,726 A | 9/1993 | Laney et al. |
| 5,256,609 A | 10/1993 | Dolhert |
| 5,266,279 A | 11/1993 | Haerle |
| 5,275,771 A | 1/1994 | Bush et al. |
| 5,279,994 A | 1/1994 | Kerkar |
| 5,284,695 A | 2/1994 | Barlow et al. |
| 5,292,436 A | 3/1994 | Mathews |
| 5,306,646 A | 4/1994 | Lauf |
| 5,322,562 A | 6/1994 | Ellenberger et al. |
| 5,335,492 A | 8/1994 | Zirkel |
| 5,345,761 A | 9/1994 | King et al. |
| 5,364,573 A | 11/1994 | Noky |
| 5,401,481 A | 3/1995 | Rochelle et al. |
| 5,401,695 A | 3/1995 | Wu |
| 5,405,571 A | 4/1995 | Truckner et al. |
| 5,409,870 A | 4/1995 | Locker et al. |
| 5,425,236 A | 6/1995 | Haerle |
| 5,427,721 A | 6/1995 | Brezny et al. |
| 5,429,779 A | 7/1995 | Locker et al. |
| 5,433,904 A | 7/1995 | Noky |
| 5,456,965 A | 10/1995 | Machida et al. |
| 5,473,008 A | 12/1995 | Hessel et al. |
| 5,476,375 A | 12/1995 | Kinkis et al. |
| 5,497,620 A | 3/1996 | Stobbe |
| 5,498,288 A | 3/1996 | Noky |
| 5,519,087 A | 5/1996 | Tang |
| 5,525,665 A | 6/1996 | Moeggenborg et al. |
| 5,547,640 A | 8/1996 | Kim |
| 5,551,971 A | 9/1996 | Chadderton et al. |
| 5,626,763 A | 5/1997 | Mathews |
| 5,639,402 A | 6/1997 | Barlow et al. |
| 5,645,730 A | 7/1997 | Malachosky et al. |
| 5,658,372 A | 8/1997 | Gadkaree |
| 5,686,039 A | 11/1997 | Merry |
| 5,705,444 A | 1/1998 | Tompkins et al. |
| 5,707,574 A | 1/1998 | Domesle et al. |
| 5,711,833 A | 1/1998 | Apte et al. |
| 5,714,228 A | 2/1998 | Beckmeyer et al. |
| 5,728,198 A | 3/1998 | Acharya et al. |
| 5,731,562 A | 3/1998 | Beckmeyer et al. |
| 5,733,352 A | 3/1998 | Ogawa et al. |
| 5,750,026 A | 5/1998 | Gadkaree et al. |
| 5,766,528 A | 6/1998 | Su et al. |
| 5,901,683 A | 5/1999 | Patel |
| 5,904,892 A | 5/1999 | Holmes et al. |
| 5,965,257 A | 10/1999 | Ahluwalia |
| 5,983,488 A | 11/1999 | Erickson et al. |
| 5,997,794 A | 12/1999 | Huang et al. |
| 6,196,344 B1 | 3/2001 | Tamor et al. |
| 6,200,379 B1 | 3/2001 | Strabala |
| 6,238,618 B1 | 5/2001 | Brundage et al. |
| 6,258,334 B1 | 7/2001 | Gadkaree et al. |
| 6,290,847 B1 | 9/2001 | Cutler |
| 6,296,794 B1 | 10/2001 | Day et al. |
| 6,322,605 B1 | 11/2001 | He et al. |
| 6,328,779 B1 | 12/2001 | He et al. |
| 6,368,102 B1 | 4/2002 | Ibrahim et al. |
| 6,375,452 B1 | 4/2002 | Nissel |
| 6,405,875 B1 | 6/2002 | Cutler |
| 6,421,599 B1 | 7/2002 | Lippa et al. |
| 6,440,198 B1 | 8/2002 | Yang et al. |
| 6,454,941 B1 | 9/2002 | Cutler et al. |
| 6,461,632 B1 | 10/2002 | Gogolewski |
| 6,464,744 B2 | 10/2002 | Cutler et al. |
| 6,468,325 B1 | 10/2002 | Cutler et al. |
| 6,612,835 B2 | 9/2003 | Ibrahim et al. |
| 6,613,299 B2 | 9/2003 | Dang et al. |
| 6,673,300 B2 | 1/2004 | Allen et al. |
| 6,695,967 B2 | 2/2004 | Bishop et al. |
| 6,696,132 B2 | 2/2004 | Beall et al. |
| 6,743,513 B2 | 6/2004 | Mechlosky et al. |
| 6,755,016 B2 | 6/2004 | Dittler et al. |
| 6,770,111 B2 | 8/2004 | Morena et al. |
| 6,827,754 B2 | 12/2004 | Suwabe et al. |
| 6,835,224 B2 | 12/2004 | Cheng |
| 6,843,822 B2 | 1/2005 | Beall et al. |
| 6,849,181 B2 | 2/2005 | Ogunwumi et al. |
| 6,881,703 B2 | 4/2005 | Cutler et al. |
| 6,883,321 B2 | 4/2005 | Fornoff |
| 6,887,291 B2 | 5/2005 | Alford et al. |
| 6,890,616 B2 | 5/2005 | Suwabe et al. |
| 6,923,941 B2 | 8/2005 | Huthwohl et al. |
| 6,942,767 B1 * | 9/2005 | Fazzina et al. ................ 204/252 |

| | | |
|---|---|---|
| 6,946,013 B2 | 9/2005 | Alward et al. |
| 6,991,668 B2 | 1/2006 | Towsley |
| 7,008,461 B2 | 3/2006 | Kuki et al. |
| 7,011,803 B2 | 3/2006 | Ichikawa et al. |
| 7,087,109 B2 | 8/2006 | Bredt et al. |
| 7,110,904 B2 | 9/2006 | Lippa et al. |
| 7,112,233 B2 | 9/2006 | Ohno et al. |
| 7,291,197 B2 | 11/2007 | Costura et al. |
| 7,328,805 B2 | 2/2008 | Price et al. |
| 7,340,887 B2 | 3/2008 | Ante et al. |
| 7,585,352 B2 | 9/2009 | Dunn |
| 7,655,088 B2 | 2/2010 | Bethani |
| 7,695,559 B1 | 4/2010 | Chartier et al. |
| 7,736,430 B2 | 6/2010 | Barron et al. |
| 7,749,476 B2 | 7/2010 | Constantz et al. |
| 7,754,169 B2 | 7/2010 | Constantz et al. |
| 8,007,573 B2 | 8/2011 | Bansal et al. |
| 2002/0003112 A1 | 1/2002 | Golden |
| 2005/0109023 A1 | 5/2005 | Kudo et al. |
| 2005/0161849 A1 | 7/2005 | Ohno et al. |
| 2005/0232827 A1 | 10/2005 | Merry |
| 2005/0265915 A1* | 12/2005 | Tonkovich et al. ............ 423/584 |
| 2006/0107658 A1 | 5/2006 | Hiranuma et al. |
| 2006/0162929 A1 | 7/2006 | Urbanek |
| 2006/0210765 A1 | 9/2006 | Ohno et al. |
| 2006/0228521 A1 | 10/2006 | Ohno et al. |
| 2006/0251909 A1 | 11/2006 | Beall et al. |
| 2006/0272319 A1 | 12/2006 | Dettling et al. |
| 2006/0287197 A1 | 12/2006 | Maslanka et al. |
| 2007/0006561 A1 | 1/2007 | Brady et al. |
| 2007/0032370 A1 | 2/2007 | Weisensel et al. |
| 2007/0041880 A1 | 2/2007 | Reinsch et al. |
| 2007/0063397 A1 | 3/2007 | Inoue |
| 2007/0179056 A1 | 8/2007 | Baek et al. |
| 2007/0224565 A1 | 9/2007 | Briselden |
| 2007/0261378 A1 | 11/2007 | Miao et al. |
| 2007/0263477 A1* | 11/2007 | Sudarsan et al. .................. 366/3 |
| 2007/0263485 A1* | 11/2007 | Yang et al. .................... 366/336 |
| 2008/0014405 A1 | 1/2008 | Sakamoto |
| 2008/0017572 A1 | 1/2008 | Kudo |
| 2008/0017573 A1 | 1/2008 | Pyzik et al. |
| 2008/0044319 A1 | 2/2008 | Takahashi et al. |
| 2008/0072551 A1 | 3/2008 | Zuberi |
| 2008/0128331 A1* | 6/2008 | Lean et al. .................... 209/155 |
| 2008/0226346 A1 | 9/2008 | Hull et al. |
| 2009/0044515 A1 | 2/2009 | Lu et al. |
| 2010/0083834 A1 | 4/2010 | Varadaraj |
| 2010/0101464 A1 | 4/2010 | Leach et al. |
| 2010/0183490 A1 | 7/2010 | Hoke et al. |
| 2010/0251937 A1 | 10/2010 | Murray et al. |

FOREIGN PATENT DOCUMENTS

| | | |
|---|---|---|
| EP | 1600202 A1 | 11/2005 |
| JP | 11029346 A | 2/1999 |
| JP | 2002248498 A | 9/2002 |
| JP | 2005060159 A | 3/2005 |
| JP | 20060004920 A | 1/2006 |
| KR | 2003002221 A | 1/2003 |

OTHER PUBLICATIONS

S-15 3D printer product description, ProMetal RCT (Ex-One), downloaded from www.exone.com Mar. 2009.
S-print product description, ProMetal RCT (Ex-One), downloaded from www.exone.com Mar. 2009.
U.S. Appl. No. 12/756,987, filed Apr. 8, 2010, Ramberg, Substrate Fabrication.
U.S. Appl. No. 12/699,736, filed Feb. 3, 2010, Ramberg, Porous Bodies and Methods.
U.S. Appl. No. 12/671,825, filed Aug. 9, 2010, Ramberg, Porous Bodies and Methods.
U.S. Appl. No. 12/183,917, filed Jul. 31, 2008, Ramberg, Porous Bodies and Methods.
Specifier's Guide for Pervious Concrete Pavement Design, Version 1.2, Colorado Ready Mixed Concrete Association, Centennial, CO. Publication date unknown; downloaded from www.crmca.org Aug. 2009.

Porous Silicon Nitride for Low Pressure Loss DPF, Hayashi, Ichiro; Shinohara, Nobuhiro; Watanabe, Toshinari; Takahashi, Hideo; Reports Res. Lab. Asahi Glass Col, Ltd., 56, pp. 25-27 (2005).
Extrusion of Lightweight Construction Materials from Fly Ash, H.D. DeFord & G.P. Wirtz, Ceram. Eng. Sci. Proc. 14 [1-2] pp. 298-308 (1993).
Characterization of glass ceramics made from incinerator fly ash, T.W. Cheng & Y. S. Chen, Ceramics International, 30, pp. 343-349 (2004).
Characterization of α-cordierite glass-ceramics from fly ash, Yong He, Weimin Chang, Hesheng Cai, Journ. Hazardous Mat. B120, pp. 265-269 (2005).
Cristobalite formation from thermal treatment of Texas lignite fly ash, M.Y.A. Mollah, S. Promreuk, R. Schennach, D.L. Cocke, R. Guler, Fuel, 78, pp. 1277-1282 (1999).
Densification of ashes from a thermal power plant, E. Benavidez, C. Grasselli, N. Quaranta, Ceramics International, 29, pp. 61-68 (2003).
Effect of borate addition on the sintered properties of pulverized fly ash, E.A. Uwe, A.R. Boccaccini, S.G. Cook, C.R. Cheeseman, Ceramics International, 33, pp. 993-999 (2007).
Engineering and environmental properties of thermally treated mixtures containing MSWI fly ash and low-cost additives, A. Polettini, R. Pomi, L. Trinci, A. Muntoni, S. Lo Mastro, Chemosphere, 56, pp. 901-910 (2004).
Flyash as Support for Ni Catalysts in Carbon Dioxide Reforming of Methane, S. Wang, G.Q. Lu, H. Y. Zhu, Chemistry Letters, pp. 385-386 (1999).
Mineralogy and microstructure of sintered lignite coal fly ash, M. Ilic, C. Cheeseman, C. Sollars, J. Knight, Fuel, 82, pp. 331-336 (2003).
Mullite ceramics derived from coal fly ash, J.S. Jung, H.C. Park, R. Stevens, Journ. Mat. Sci. Letters, 20, pp. 1089-1091 (2001).
Physical-mechanical and environmental properties of sintered municipal incinerator fly ash, G. De Casa, T. Mangialardi, A. E. Paolini, L. Piga, Waste Management, 27, pp. 238-247 (2007).
Processing and properties of a glass-ceramic from coal fly ash from a thermal power plant through an economic process, J. M. Kim, H, S. Kim, Journ. Europ. Ceram. Soc., 24, pp. 2825-2833 (2004).
Sintering of a class F fly ash, J. J. Biernacki, A. K. Vazrala, H. W> Leimer, Fuel, 87, pp. 782-792 (2008).
Synthesis of cordierite from fly ash and its refractory properties, S. Kumar, K.K. Singh, P. Ramachandrarao, Journ. Mat. Sci. Letters, 19, pp. 1263-1265 (2000).
International Search Report and Written Opinion, prepared by KIPO for PCT/US2008/071793, "Porous Bodies and Methods" (Feb. 2009).
U.S. Appl. No. 13/171,489, filed Jun. 29, 2011, Ramberg, Layered Structures.
U.S. Appl. No. 12/699,736, filed Feb. 3, 2010, Ramberg, Porous Bodies and Methods, Office Actions Oct. 20, 2011.
U.S. Appl. No. 13/316,534, filed Dec. 11, 2011, Ramberg, Porous Bodies and Methods.
U.S. Appl. No. 13/327,300, filed Dec. 15, 2011, Ramberg, Porous Bodies and Methods.
Machine translation of JP 11029346, Yamamoto, Haruo.
Office Action mailed Aug. 12, 2011 in U.S. Appl. No. 13/152,273.
Office Action mailed Jun. 13, 2011 in U.S. Appl. No. 12/671,825.
Office Action mailed Aug. 12, 2011 in U.S. Appl. No. 13/152,275.
An initial study of the fine fragmentation fly ash particle mode generated during pulverized coal combustion, W. S. Seames, Fuel Processing Technology, 81, pp. 109-125 (2003).
Characterization of a glass-ceramic produced from thermal power plant fly ashes, M. Erol, A. Genc, M.L. Ovecoglu, E. Yucelen, S. Kucukbayrak, Y. Taptik, J. Europ. Ceram. Soc., 20, pp. 2209-2214 (2000).
Characterization of the bottom ash in municipal solid waste incinerator, J. M. Chimenos, M. Segarra, M. A. Fernandez, F. Espiell, Journ. Hazard. Materials, A:64, pp. 211-222 (1999).
Crystallization and properties of glasses prepared from Illinois coal fly ash, E. J. DeGuire, S. H. Risbud, J. Mat. Sci., 19, pp. 1760-1766 (1984).
Commercially Useful By-Products of Coal Combustion, M. R. Gottschalk, J. R. Hellmann, B. E. Scheetz, Ceramic Transactions, vol. 119, pp. 125-134 (2001).

Viscous Sintering of Coal Ashes. 2. Sintering Behavior at Short Residence Times in a Drop Tube Furnace, B. Jung & H. Schobert, Energy & Fuels, 6, pp. 59-68 (1992).
Conversion to glass-ceramics from glasses made by MSW incinerator fly ash for recycling, Y.J. Park, J. Heo, Ceramics Int'l., 28, pp. 689-694 (2002).
Ceramic Diesel Particulate Filters, J. Adler, Int. J. Appl. Ceram. Technol., 2 [6] pp. 429-439 (2005).
Office Action mailed Dec. 21, 2010 in (U.S. Appl. No. 12/183,917).
Machine translation of KR 2003002221 A, provided by USPTO with Office Action mailed Dec. 21, 2010 in U.S. Appl. No. 12/183,917, Jeong, In-Hwa, et al.
Office Action mailed Jan. 2011 in (U.S. Appl. No. 12/671,825).
Fabrication and Physical Properties of Honeycomb Type Cordierite Ceramic Filter Using Fly Ash; Sung-Jin Kim, et al., Journal of the Korean Ceramic Society, 43, 351-357 (2006) as provided by USPTO with Office Action mailed Jan. 2011 in U.S. Appl. No. 12/671,825.
Mineral Sequestration of CO2 by aqueous carbonation of coal combustion fly ash; G. Montes-Hernandez et al., Journal of Hazardous Materials, 161, 1347-1354 (2008).
Ash to Reduce Trace Element Mobility; T.A. Tawfic, Wyoming Water Resources Center (1995).
Translation of abstract and front matter of KR 2003002221 A.
Fabrication of Cordierite Honeycomb from Fly Ash; Sung-Jun Kim, et al., Materials Science Forum vols. 534-536 (2007) pp. 621-624.
Office Action mailed Oct. 20, 2011 in U.S. Appl. No. 12/699,736.
Supplementary European Search Report received from the European Patent Office for European Patent Application 08796966.3-2113/2180933 (PCT/US2008071793), which is related to PCT Patent Application No. PCT/US08/71793, U.S. Appl. No. 12/183,917 and their related applications.
Office Action mailed Dec. 9, 2011 in (U.S. Appl. No. 12/671,825).
U.S. Appl. No. 13/316,534, filed Dec. 11, 2011, Ramberg, Porous Bodies and Methods, Office Actions Jan. 26, 2012.
U.S. Appl. No. 13/327,300, filed Dec. 15, 2011, Ramberg, Porous Bodies and Methods, Office Actions Jan. 25, 2012.
U.S. Appl. No. 12/699,736, filed Feb. 3, 2010, Ramberg, Porous Bodies and Methods, Office Actions Oct. 20, 2011, Feb. 13, 2012.
Office Action mailed Jan. 25, 2012 in (U.S. Appl. No. 13/327,300).
Machine translation of JP 2006004920 (Jan. 2006), Yasuda Masahiro.
Office Action mailed Jan. 26, 2012 in (U.S. Appl. No. 13/316,534)).
Office Action mailed Feb. 13, 2012 in U.S. Appl. No. 12/699,736.
Translation of EP-0337047, Oct. 1998 (DeBoodt).
Response to Supplementary European Search Report associated with (European patent application No. 08 796 966.3-2113, which is the National Stage application associated with PCT/US08/71793, which is the related PCT application of U.S. Appl. No. 12/183,917, 12/671,825, and their child applications).
U.S. Appl. No. 12/756,987, filed Apr. 8, 2010, Ramberg, Substrate Fabrication, Office Actions Jan. 9, 2012.
U.S. Appl. No. 13/171,489, filed Jun. 29, 2011, Ramberg, Layered Structures.
U.S. Appl. No. 13/152,273, filed Jun. 3, 2011, Ramberg, Porous Bodies and Methods, Office Actions Aug. 12, 2011.
U.S. Appl. No. 13/152,275, filed Jun. 3, 2011, Ramberg, Porous Bodies and Methods, Office Actions Aug. 12, 2011.
U.S. Appl. No. 13/316,534, filed Dec. 11, 2011, Ramberg, Porous Bodies and Methods, Office Actions Jan. 26, 2012, Apr. 26, 2012.
U.S. Appl. No. 13/327,300, filed Dec. 15, 2011, Ramberg, Porous Bodies and Methods, Office Actions Jan. 25, 2012, May 3, 2012.
U.S. Appl. No. 12/699,736, filed Feb. 3, 2010, Ramberg, Porous Bodies and Methods, Office Actions Oct. 20, 2011 Feb. 13, 2012, May 14, 2012.
U.S. Appl. No. 12/671,825, filed Aug. 9, 2010, Ramberg, Porous Bodies and Methods, Office Actions Jan. 20, 2011; Jun. 13, 2011, Dec. 9, 2011.
U.S. Appl. No. 12/824,070, filed Jun. 25, 2010, Ramberg, Powertrain Controls.
U.S. Appl. No. 12/183,917, filed Jul. 31, 2008, Ramberg, Porous Bodies and Methods, Office Actions Dec. 21, 2010.
U.S. Appl. No. 13/343,713, filed Jan. 5, 2012, Ramberg, Aerodynamic Aftertreatment.
"Changing the Substrate Technology to met future Emission Limits", Lorenzo Pace and Manuel Presti, Emitec gmbh, downloaded fromhttp://www.emitec.com/en/bibliothek-downloads/overview.html on Feb. 21, 2012.
Metal Supported Catalysts for Large-Volume Engine Applications: From Designing to Recycling 4th AVL Large Engine Techdays May 5 & 6, 2010 Dr.-Ing. Raimund Müller Dipl.-Ing. Oswald Holz Dr.-Ing. Andreas Scheeder, EMITEC Gesellschaft für Emissionstechnologie mbH Emitec gmbh, downloaded fromhttp://www.emitec.com/en/bibliothek-downloads/overview.html on Feb. 21, 2012.
"Application of PM-METALIT® and SCRi® Systems" Rolf Brück, Klaus Müller-Haas, Oswald Holz, Peter Hirth EMITEC Gesellschaft für Emissionstechnologie mbH Robert-Gilles Entlesberger,Thomas Cartus AVL List GmbH, downloaded from http://www.emitec.com/en/bibliothek-downloads/overview.html on Feb. 21, 2012.
Development of an Integrated NOx an PM Reduction Aftertreatment System: SCRiTM for Advanced Diesel Engines. Michael Rice, Jan Kramer, Emitec Inc. Dr. Raimund Mueller, Klaus Mueller-Haas, Emitec GmbH, SAE World Congress, Apr. 2008, downloaded from http://www.emitec.com/en/bibliothek-downloads/overview.html on Feb. 21, 2012.
Office Action mailed May 3, 2012 in U.S. Appl. No. 13/327,300.
Advisory Action mailed May 14, 2012 in (U.S. Appl. No. 12/699,736).
Machine Translation of JP 2002-24898 A, published Sep. 3, 2002, as provided by USPTO in (U.S. Appl. No. 13/327,300) May 3, 2012.
Machine Translation of abstract of JP 2005-060159 A, published Mar. 10, 2005, as provided by USPTO in (U.S. Appl. No. 13/327,300) May 3, 2012.
Grutzeck, et al., "Zeolites Synthesized from Class F Fly Ash and Sodium Aluminate Slurry" 1997, J. Am. Ceram. Soc., 80 [9] as provided by USPTO in (U.S. Appl. No. 13/327,300) May 3, 2012.
Wang et. Al., "Characterizing the Metal Absorption Capacity of a Class F Coal Fly Ash," Environ. Sci., Technol., 2004, 38, 6710-6715, as provided by USPTO in (U.S. Appl. No. 13/327,300) May 3, 2012.

* cited by examiner

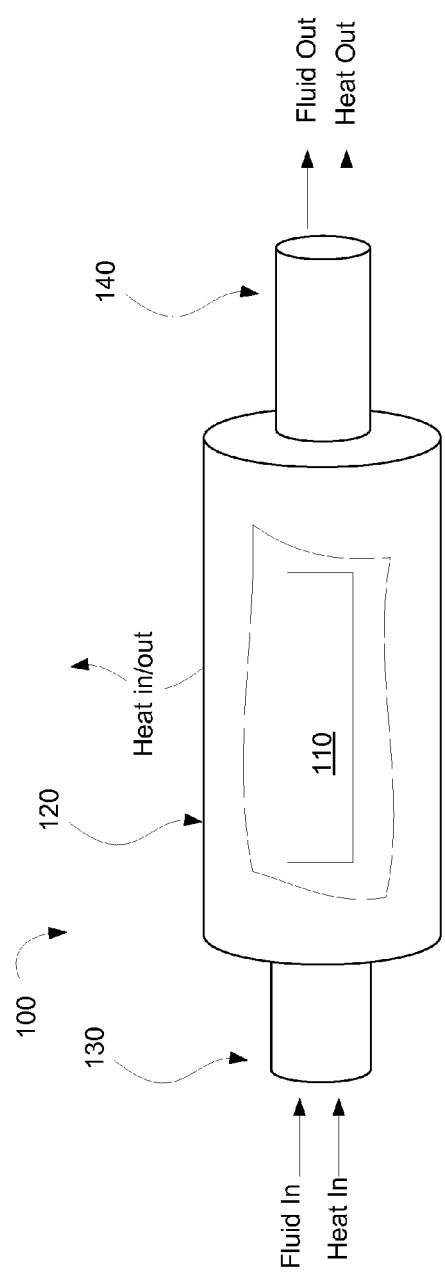
FIG. 1A
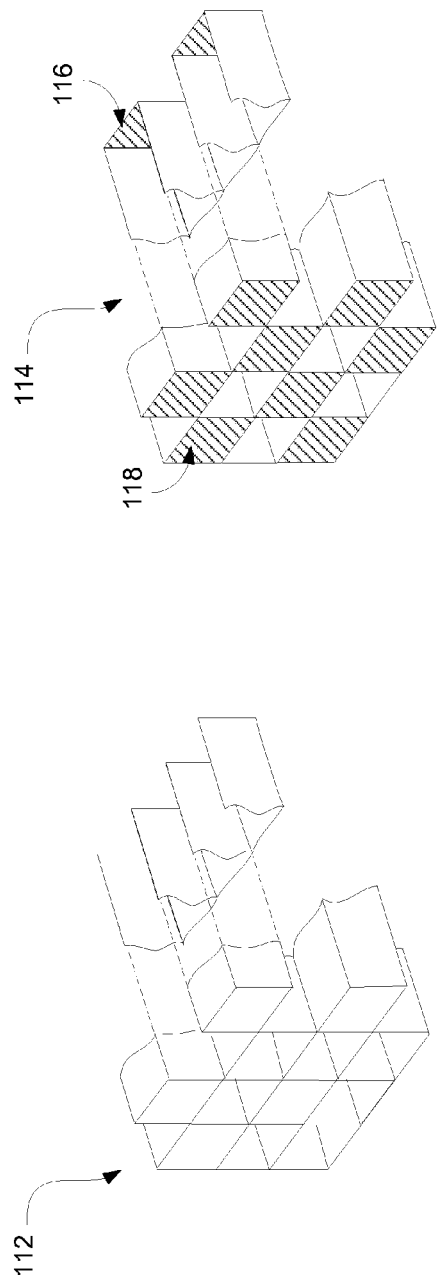
FIG. 1B
FIG. 1C

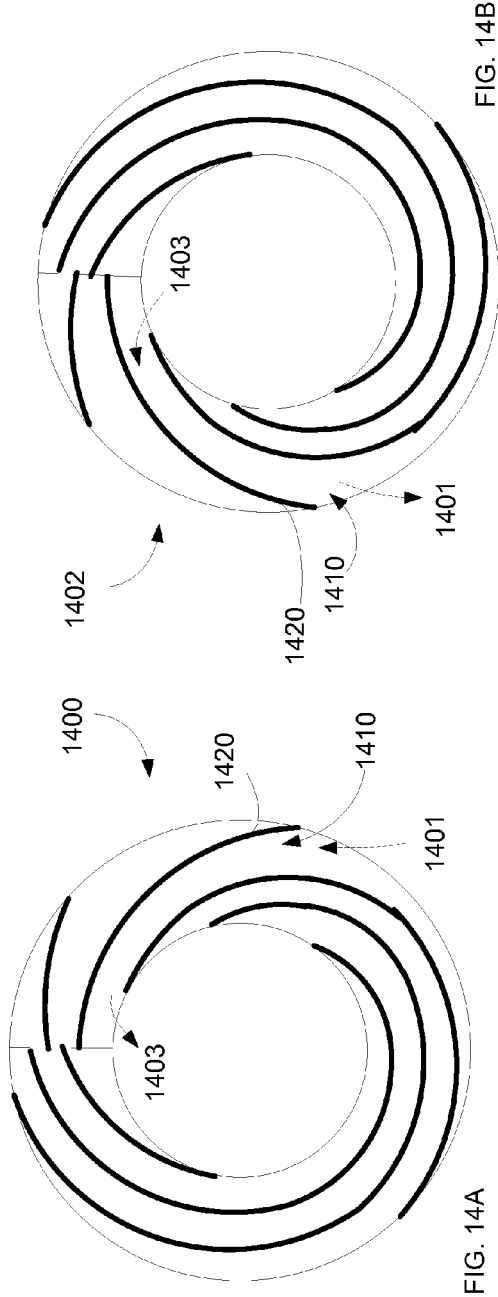
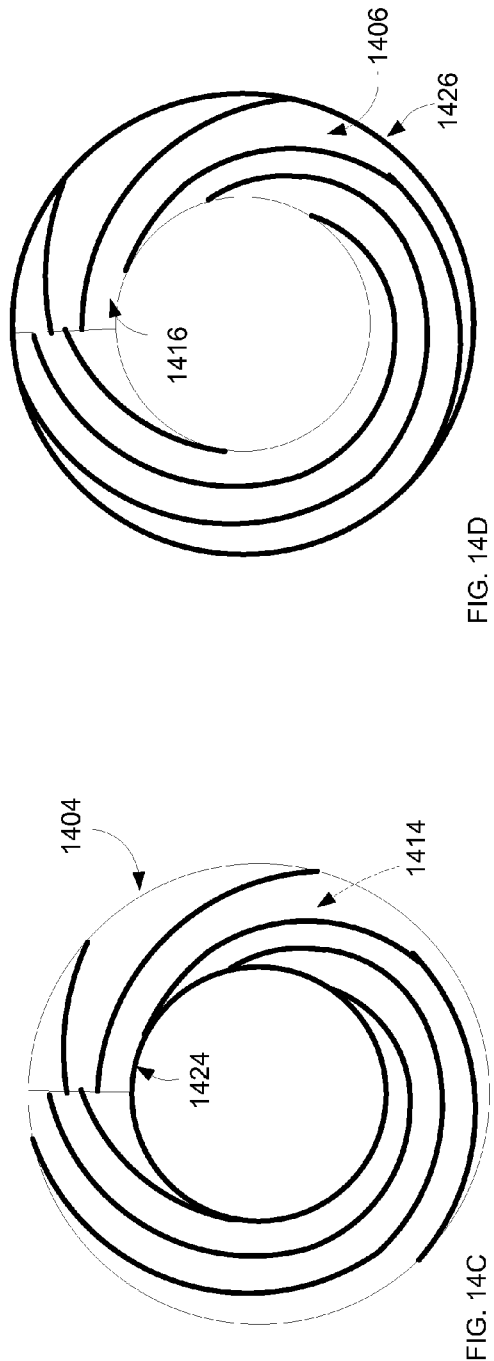
FIG. 14A
FIG. 14B
FIG. 14C
FIG. 14D

SUBSTRATE FABRICATION

CROSS REFERENCE TO RELATED APPLICATIONS

This description claims the priority benefit of U.S. provisional patent application No. 61/167,857, filed Apr. 8, 2009, the disclosure of which is incorporated herein by reference. This description is related to U.S. patent application Ser. No. 12/183,917, now U.S. Pat. No. 7,981,375, filed Jul. 31, 2008, the disclosure of which is incorporated herein by reference.

BACKGROUND

1. Technical Field

The present invention relates generally to reactors, and more particularly to fabricating substrates that may be used in reactors.

2. Description of Related Art

Many reactions involving fluids (e.g., gases, liquids, and the like) use reactors. Many reactions are temperature dependent, and so a reactor (or zone within a reactor) may be required to have certain chemical, mechanical, thermal, and other properties at a temperature of interest to the reaction. Some reactions are performed at high temperatures (e.g., above 100 C, above 400 C, above 800 C, above 1100 C, or even above 1500 C), and so may require reactors having appropriate properties at the temperature of interest. Some reactions entail a heterogeneous reaction (e.g., involving a fluid and a surface).

Abatement of exhaust streams (e.g., from engines, turbines, power plants, refineries, chemical reactions, solar panel manufacturing, electronics fabrication, and the like) may include heterogeneous reactions. In some cases, the period of time during which a fluid interacts with a surface may affect the efficacy of a reaction. Certain reactions may benefit from increased contact times between a fluid and a substrate. Certain reactions may benefit from reduced contact times between a fluid and a substrate.

Some reactions proceed at practical rates at high temperatures. In some cases, an exhaust stream may provide heat that may heat a reactor (e.g., as in a catalytic converter on an automobile). Controlling both contact time (e.g., between a fluid and a reactor) and a temperature at which the reaction occurs may be challenging with typical reactor designs, particularly when heat transfer and mass transfer are not independently controlled.

Effective reaction (e.g., mitigation of a pollutant) may require a reactor design that maintains a desired temperature or range of temperatures over a certain volume or region having a certain surface area, notwithstanding that the primary source of heat to the reactor may be the exhaust stream. Such requirements may be challenging, particularly when mass transfer and/or reaction kinetics are at odds with heat transfer kinetics (e.g., from an exhaust stream to a reactor, or from the reactor to the environment).

The use of exhaust heat to maintain a reactor temperature may result in impaired performance under some conditions. For example, a catalytic converter may inefficiently decompose pollutants prior to having been heated to an appropriate temperature (e.g., when the vehicle is cold). A diesel particulate filter may require "regeneration" (e.g., the creation of a temperature and oxygen partial pressure sufficient to oxidized accumulated soot). Regeneration often requires heating the filtered soot to an oxidation temperature, which often relies on heat from the exhaust stream and/or heat from other sources. Regeneration may require electrical heating of a reactor. Some combinations of engines and duty cycles may result in contaminants (e.g., soot) reaching unacceptable levels before a mitigation system begins efficient operation (e.g., a soot filter may "fill up" before regeneration occurs.

Regeneration may require injection of a fuel and associated combustion heating beyond the motive heat associated with the working engine (e.g., direct injection of fuel into an exhaust stream). In some cases, the provision of regeneration heat (e.g., via electrical heating, post-injection, downstream injection, and the like) may decrease the overall efficiency of a system.

Some streams of fluids may be subject to a plurality of reactions and/or reactors. For example, a diesel exhaust mitigation system may include a diesel oxidation reactor (e.g., to oxidize CO and/or hydrocarbons), a particulate filter, and a reactor to remove NOx (oxides of Nitrogen). In some cases, these reactors are disposed in series, and so an exhaust system may include several components, each having an inlet and outlet, with the outlet of one component connected to the inlet of another component. Such systems may be complex and/or difficult to integrate.

In some cases, each component may require a separate mass and/or heat injection apparatus. For example, excess diesel fuel may be injected into an exhaust stream to create combustion at a diesel oxidation reactor in order to raise an inlet temperature of a particulate filter. A NOx reactor may require injection of a reductant, (e.g., urea, ammonia, Hydrogen, and/or other fuel) in order to facilitate a reaction at a certain temperature. A diesel particulate filter may benefit from NOx injection (e.g., to oxidize soot).

In some cases, latent heat and/or chemical species exiting a first reactor may not be efficiently utilized in a second "downstream" reactor, notwithstanding that the heat and/or species might be useful in the downstream reactor. In some cases, the heat and/or species exiting a first reactor must be controlled in such a way that performance of a downstream reactor is not inhibited. Improved reactor designs might provide for such control.

Many refractory substrates (e.g., catalytic converter, diesel particulate filter, and the like) are fabricated using extrusion. Such substrates often have long channels, with the "long" direction of the channels associated with the extrusion direction. The long direction may also be aligned with the flow of fluid through the substrate. As a result, reaction kinetics, heat transfer kinetics, fluid flow properties, and the like may be constrained by the method of fabrication of the substrate (e.g., extrusion). For example, a certain minimum residence time (associated with a reaction) may require a substrate having a minimum length, which may dictate an extruded substrate whose length is impractical for a given application.

For a typical filter (e.g., a diesel particulate filter, or DPF), filtration may preferentially begin at regions having higher fluid flow rates. In some cases, the deposition of particles may preferentially occur at the downstream end of a filter substrate, and so a particulate filter may "fill up" from the downstream end toward the upstream end.

A DPF may be "regenerated" by oxidizing filtered particles (e.g., filtered soot). Often, the downstream end of a DPF substrate may be cooler than the upstream end, and so regeneration of soot may require that the coolest part of the substrate reach regeneration temperatures. In certain applications, it may be advantageous to provide for preferential soot filtration at portions of the substrate that heat up faster than other portions.

SUMMARY OF THE INVENTION

Reactors and reactor substrates are described. Design guidelines are described. In some embodiments, a reactor design provides for improved control of heat transfer between a fluid and a reactor involved in a reaction with the fluid. Certain reactors may be used for filtration of particulates from a fluid stream. In some cases, preferential filtration may occur in regions of a reactor that are more amenable to regeneration. In some cases, soot may preferentially be filtered in regions of a reactor that reach regeneration temperatures sooner than other regions of the reactor.

Methods for forming reactors are described. Certain methods include depositing a layer of particulate material and bonding a portion of the layer using a bonding apparatus. Bonding may include incorporating a polymer into the layer, and in some cases, a laser may be used to fuse the portion. A layer may include a first material (e.g., a ceramic powder from which a reactor may be fabricated) and a second material (e.g., a binder to bind the powder). A layer may include a fugitive phase. A binder may behave as a fugitive phase. An activator may be deposited onto portions of the layer, which may activate bonding among the various particles exposed to the activator. A binder may include organic material (e.g., a polymer), which in some embodiments is oxidized to yield a porous body. A fugitive phase may be included. A fugitive phase may include a material whose incorporation into a body (e.g., bound to other materials forming the body) may be followed by a step that decomposes the fugitive phase, leaving pores associated with the shape, size, and/or distribution of the fugitive phase. A binder may include a fugitive phase.

Repeated deposition of layers with concomitant delineation of portions may be used to build up a substrate. Built up substrates may be sintered to remove a bonding polymer and form refractory bonds between particles. Substrates may be substantially comprised of fly ash. Substrates may have between 10 and 80% porosity.

An appropriately designed series of reactors may utilize the heat, mass flow, and chemical species from a first reactor to improve the performance of a second reactor connected to the first reactor.

A reactor may have an inlet and an outlet, and may include a substrate configured to react with (or provide for a reaction involving) a fluid passing from the inlet to the outlet. A line from the inlet to the outlet may describe a flow direction through the reactor. In some cases, the substrate includes a first end in fluid communication with the inlet and a second end in fluid communication with the outlet. The substrate may include one or more channels to treat a fluid passing from the inlet to the outlet. In some aspects the first channel is in fluid communication with the inlet and the outlet. The first channel may be shaped to cause a fluid flowing through the first channel to take a direction that deviates from the flow direction by at least 5 degrees, at least 10 degrees, at least 20 degrees, at least 30 degrees, or even at least 45 degrees. In some cases the deviation is less than 90 degrees.

Some channels are shaped and/or include features to induce secondary flows in the fluid flowing through the channel. A secondary flow (e.g., an eddy, a vortex, and the like) may increase a deposition of a species (e.g., soot) on a wall of the channel. A secondary flow may increase a residence time and/or contact time between the fluid and a wall of the channel. A secondary flow may provide for improved chemical reactions.

Some channels may be helical. In some cases, substrates may be comprised of helical channels, and an "interior" of the helix may be separated from the "exterior" of the helix by the substrate walls. In some cases, the interior may be in fluid communication with an inlet and an exterior may be in fluid communication with an outlet. The interior and exterior may be in fluid communication via one or more channels.

Certain embodiments include filters. In some cases, a first channel may be in fluid communication with an inlet to a reactor, and a second channel may be in fluid communication with an outlet of a reactor. The first and second channels may be separated by a porous wall, such that fluid passing from the first channel to the second channel may be filtered.

In certain embodiments, the first and second channels are helical. The first channel may be in fluid communication with an exterior of the helix, and the second channel may be in fluid communication with an interior of the helix (or vice versa).

Some reactors include a first substrate having a first channel configuration and a second substrate having a second channel configuration. The first and second substrates may be arranged in series (with respect to fluid flow). The first and second substrates may be arranged in parallel (with respect to fluid flow). In some cases, the first and second substrates are helical and coaxial. In some cases, the first and second substrates have different numbers of channels, channel shapes, flow patterns (e.g., flow through or wall flow), catalysts, channel cross sectional area to volume ratios, channel porosity, and other factors. First and second substrates may include different materials. A first substrate may be fabricated form SiC, and a second substrate may be fabricated from cordierite. A substrate may include ash, such as fly ash, and may include cenospheres.

Some substrates may be configured for filtration of particulate material (e.g., from diesel engines). Some designs provide for flow field instabilities that enhance the surface deposition of particulates on walls of various channels. Certain substrates provide for "virgin" substrates having a first portion of higher permeability than a second portion. Some substrates provide for a preferential flow and/or filtration of particles in a region that heats up (e.g., from exhaust gas heat) more quickly than a second region.

Some substrates include channels having "channel plugs" that are disposed within the substrate. In some cases, channel walls are configured to perform as channel plugs, which may increase a surface area of the "plugs" in some embodiments.

A substrate for use in a reactor having an inlet and an outlet, the substrate may include a plurality of tubular first channels in fluid communication with the inlet, the tubular first channels including channel walls, at least a portion of the channel walls having a porosity greater than 20%; the plurality of tubular first channels connected to each other by their channel walls. The substrate may include a plurality of second channels in fluid communication with the outlet, the plurality of second channels having shapes that correspond to the interstitial volumes between the plurality of tubular first channels. The plurality of tubular first channels may be square packed, trigonally packed, hexagonally packed, and/or randomly packed. In some cases, a random packing may provide for a diversity cross sectional areas in the plurality of second channels.

BRIEF DESCRIPTION OF THE DRAWINGS

FIG. 1A illustrates a reactor including a substrate, according to some embodiments.

FIG. 1B illustrates an exemplary flow-through substrate 112, according to some embodiments.

FIG. 1C illustrates an exemplary wall-flow filter substrate, according to some embodiments.

FIGS. 14A-D illustrate subchannels incorporating inward/outward flow, according to some embodiments.

DETAILED DESCRIPTION OF THE INVENTION

Figure 2A:
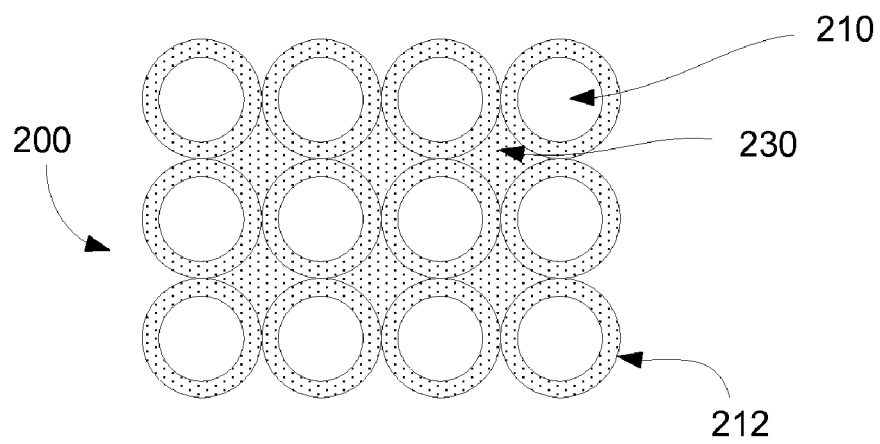
FIGS. 2A-C illustrates several features of some reactor substrates.

Various aspects provide for reactors and the fabrication of reactors. Some reactors include surfaces that provide for heterogeneous reactions involving a fluid (and/or components thereof). A fluid may be a gas and/or a liquid. A contaminant in the fluid (e.g., a dissolved or suspended substance) may react in a reaction. Some reactors provide for independent control of heat transfer (between the fluid, the reactor, and the environment) with respect to mass transfer (e.g., fluid flow through the reactor).

The design of a reactor may incorporate a combination of properties describing a fluid to be reacted. For example, a reactor comprising a catalytic converter may be designed according to an engine type (2 stroke, 4 stroke, Atkinson cycle, Otto cycle, and the like), an amount of electrical hybridization (non-hybrid, mild hybrid, full hybrid), an expected duty cycle (garbage truck, backup generator, string trimmer, tug boat, locomotive, and the like), a fuel source (bunker fuel, ULSD, gasoline, E85, biodiesel, premixed oil/gas solutions), and the like. Some reactors may be "disposable."

FIG. 1A illustrates a reactor including a substrate, according to some embodiments. Reactor 100 may include a substrate 110 that interacts with a fluid flowing through the reactor. A reactor may have an inlet 130 through which a fluid enters the reactor, and an outlet 140 from which the fluid exits the reactor. The combination of inlet and outlet (or a fluid-flow direction) may describe "upstream" and "downstream" features. For example, a substrate may have an upstream face and a downstream face according to the orientation of the substrate (e.g., with respect to the fluid flow).

A substrate is typically contained within a package, such as package 120. A package may prevent uncontrolled mass transfer with the environment. Package 120 may be designed to improve heat flow into or out of the reactor (e.g., insulated at certain portions and/or heat fins at certain portions).

In many reactors, a fluid enters the inlet at a certain temperature with a certain composition and exits the reactor at another temperature and another composition. Chemical reactions inside the reactor may be influenced (or even controlled) by heat transfer from the fluid to the substrate (and by extension between reactor 100 and the environment).

Surfaces of a substrate may be coated with a catalyst to modify a reaction. A fluid may include a catalyst (e.g., dispersed in the fluid, such as a fuel-borne catalyst). A catalyst may be injected into a reactor (e.g., upstream of the substrate). In some embodiments, a catalyst may be injected between the upstream and downstream regions of a substrate.

FIG. 1B illustrates an exemplary flow-through substrate 112, according to some embodiments. A flow-through substrate may be a high surface area (e.g., highly porous) solid, and often includes a plurality of channels through which a fluid passes.

FIG. 1C illustrates an exemplary wall-flow filter substrate, according to some embodiments. A wall-flow substrate may include a plurality of upstream channels (plugged at a downstream end by downstream plugs 116) and a plurality of downstream channels (plugged at an upstream end by upstream plugs 118). A wall-flow substrate may filter a fluid by requiring passage of the fluid through a wall separating an upstream channel from a downstream channel.

Figure 2B:
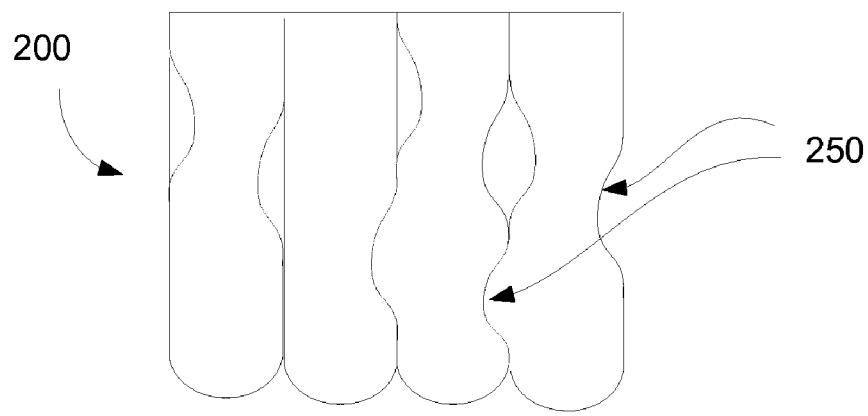
Figure 2C:
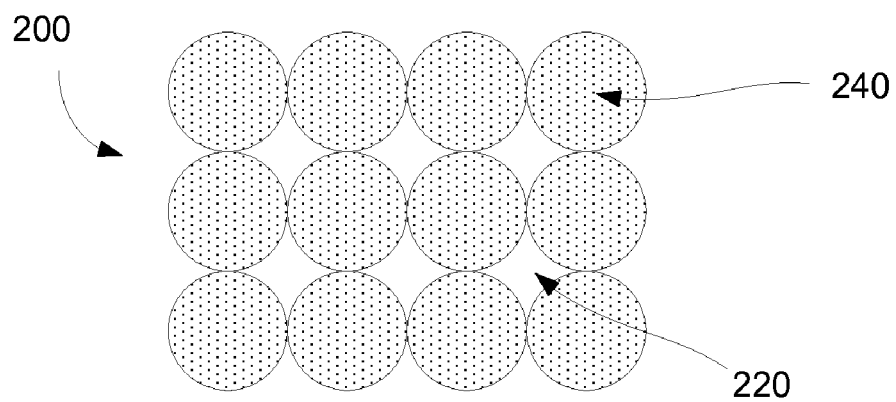

FIGS. 2A-C illustrates several features of some reactor substrates. FIGS. 2A-C illustrate views of an upstream face (FIG. 2A), side face (FIG. 2B), and downstream face (FIG. 2C). Demarcation as "upstream" and "downstream" is made for illustrative simplicity; a "downstream" face may be disposed "upstream" in a given application. Substrate 200 (viewed in FIG. 2A) includes a plurality of upstream channels 210, defined by channel walls 212. Downstream channels 220 may be created by plugging areas between channels 210, for example using upstream plugs 230. Conversely, upstream channels may be plugged (in this example at the downstream end) with downstream plugs 240 (FIG. 2C). As such, a fluid passing into upstream channels 210 may pass through the channel walls into downstream channels 220. Substrate 200 includes "plugs" disposed at the "ends" of the substrate. In some embodiments, channels may be plugged within the substrate (i.e., disposed from either end).

Certain embodiments include channels that may be characterized as tubular. In some cases, tubes may be square packed (e.g., a tube contacting four other tubes), hexagonally close packed (e.g., a tube touching six other tubes), trigonally packed (e.g., a tube touching three other tubes). In some examples, a tube touches five other tubes. Packing of tubes may be modified to control (inter alia) the relative cross sectional area of upstream channels to downstream channels.

FIG. 2 also illustrates optional flow modifiers 250. A flow modifier may be a structure that alters fluid flow through the substrate, through a channel, around a substrate, through a reactor, and the like. In the example shown in FIG. 2, flow modifiers 250 include modifications to channel wall shapes that may alter fluid flow (e.g., increase turbulence) within the channels. Flow modifiers may be included with upstream channels, downstream channels, plugs, walls, and in other regions. A flow modifier may induce deposition of a phase (e.g., soot) from a fluid being treated (e.g., in an eddy). A flow modifier may create a local region having reduced flow velocities, which may increase a contact time between the fluid and the substrate.

Figure 3:
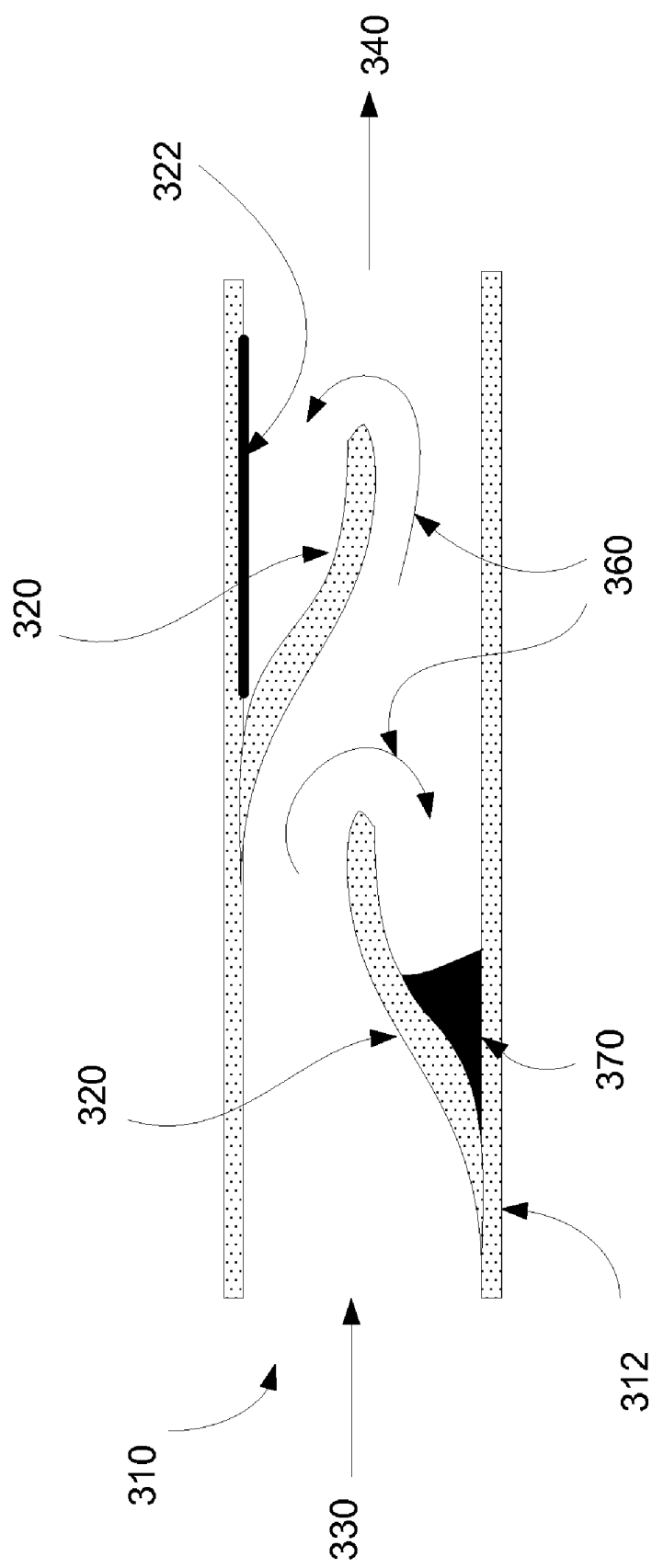
FIG. 3 illustrates an embodiment of a channel that includes flow modifiers.

FIG. 3 illustrates an embodiment of a channel that includes flow modifiers. Channel 310 includes wall 312 and flow modifiers 320. In this example, flow modifiers 320 are configured to modify a flow of fluid within channel 310 (e.g., flowing from inlet 330 to outlet 340). In this example, flow modifiers 320 are shaped to create eddies 360. Eddies 360 may be used to increase a residence time and/or contact time between a fluid and a wall. An optional catalyst 322 (e.g., associated with a reaction requiring a "longer" contact time) may be preferentially deposited on and/or injected near a flow modifier (whose behavior may increase an average residence time).

Eddies 360 may enhance a deposition of entrained particulates (e.g., in a fluid in an upstream channel), as illustrated by deposit 370. In some embodiments, a flow-through filter may trap substantial quantities of entrained particles by providing a large number of flow modifiers in upstream channels. Some embodiments may result in improved resistance to clogging by deposited particles. Flow modifiers may be used to (e.g., in a downstream channel) to slow the flow of fluid through the channel, which may result in increased transfer of heat from the fluid to the substrate prior to exiting the substrate. Certain embodiments include a helical flow modifier, which may increase the transfer of heat from a fluid to the substrate.

Various embodiments include channels designed to induce secondary flows in a fluid (e.g., in addition to a primary flow describing flow of the fluid through or past a substrate). Secondary flows may be associated with instabilities in the flow field describing the fluid, and may result from features that induce a change in the flow path of the fluid. Curves and/or curvature in a channel may cause such instabilities. Flow modifiers may cause such instabilities. In some cases, a feature and/or shape of a substrate may result in an induced instability and/or be associated with a vortex or vortices. Certain substrates may induce Taylor vortex flow, Taylor-Couette flow, wavy vortex flow, spiral vortex flow, and/or other instabilities in a fluid. Some substrates may induce turbulent flow. Some embodiments includes channels having a changing cross sectional area with position in a fluid flow path (e.g., a decreasing cross sectional area, an increasing cross sectional area, a "neck" in the path, and the like).

Figure 4:
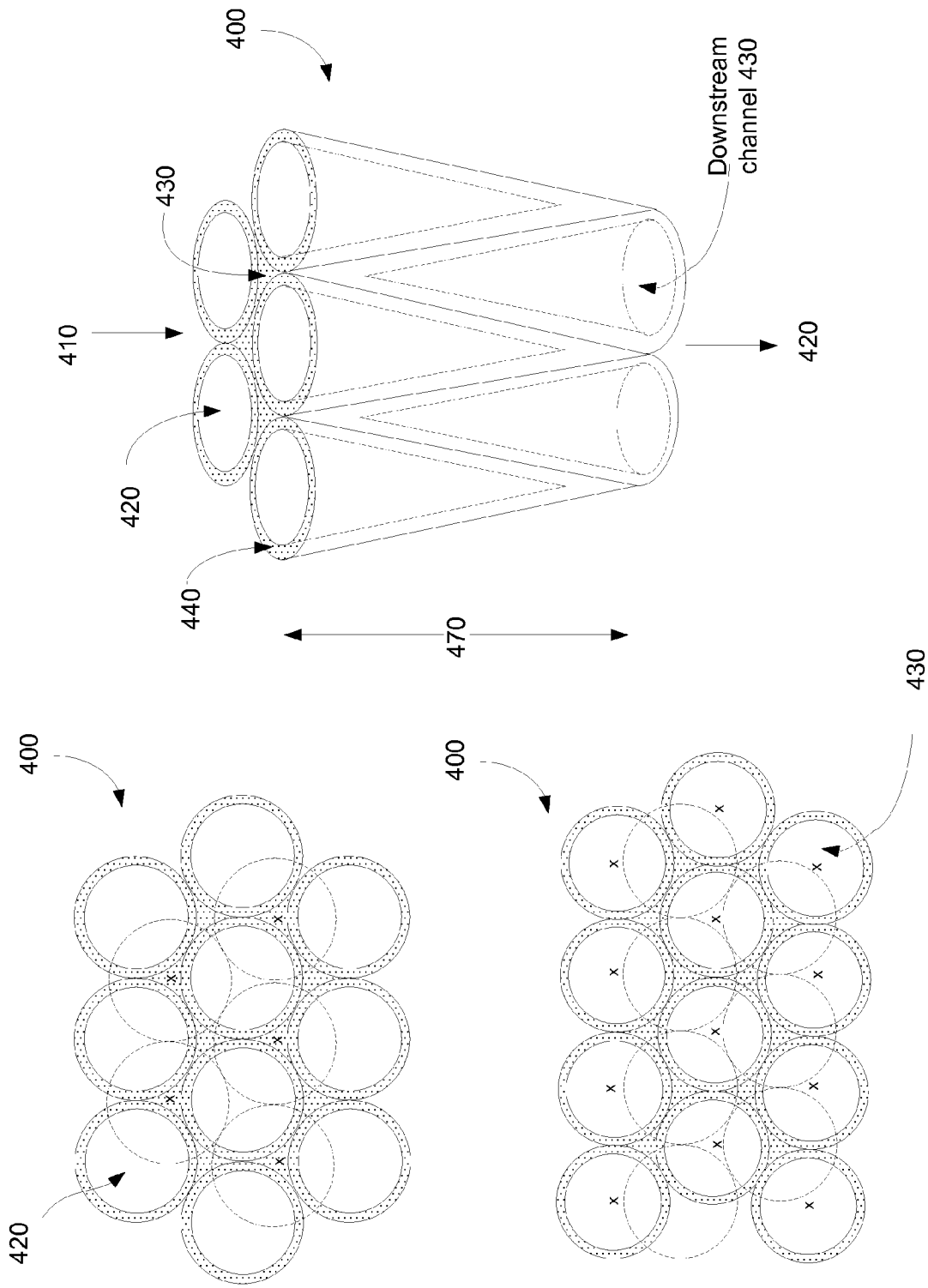
FIG. 4 illustrates views of a substrate according to some embodiments.

FIG. 4 illustrates views of a substrate according to some embodiments. Substrate 400 may be disposed with respect to an inlet 410 and an outlet 412. "Upstream" channels 420 may be separated from "downstream" channels 430 by channel walls 440, which may be porous and provide for passage of at least a portion of the fluid from upstream channels to downstream channels. Upstream channels 420 may receive a fluid from inlet 410, and a fluid may exit substrate 400 via downstream channels 430 to outlet 412. Substrate 400 may include upstream plugs 430. In substrate 400, the "downstream plugs" may correspond to the shaped walls of the downstream ends of upstream channels 420. In this example, these ends are conical, although other shapes are possible.

In some embodiments, channel walls substantially form the upstream and/or downstream plugs. In such cases, the surface area of the "plugs" may approach the surface area of the channels. For example, the circular cross sections at the upstream end of upstream channels 420 may be "flared" at the upstream end to form hexagonal cross sections, which may increase the total cross sectional area of upstream channels exposed to inlet 410. A transition from upstream to downstream need not be monotonic (e.g., conical as shown in FIG. 4).

Channels may be separated by channel walls 440. In some embodiments, a fluid enters upstream channels 410, passes through channel walls 440 into downstream channels 430. Substrate 400 may be implemented as a filter.

Substrate 400 may be characterized by a length 470. In some embodiments, the cross sectional area of upstream and/or downstream channels may vary as a function of the length. In the example shown in FIG. 4, the cross sectional area of the upstream channels decreases in the "downstream" direction, and the cross sectional area of the downstream channels increases in the "downstream" direction. In other embodiments, cross sectional areas may vary in other ways (e.g., as with channels in subtrate 200 (FIG. 2)). In some embodiments, the variation of cross sectional area within a channel (e.g., an upstream channel) may be designed such that a substantial quantity of filtered material (e.g., soot) is trapped a substantial distance from the outlet (e.g., 25% of the length "upstream" from the downstream end of the substrate, or even 50%, or even 80%).

Figure 5A:
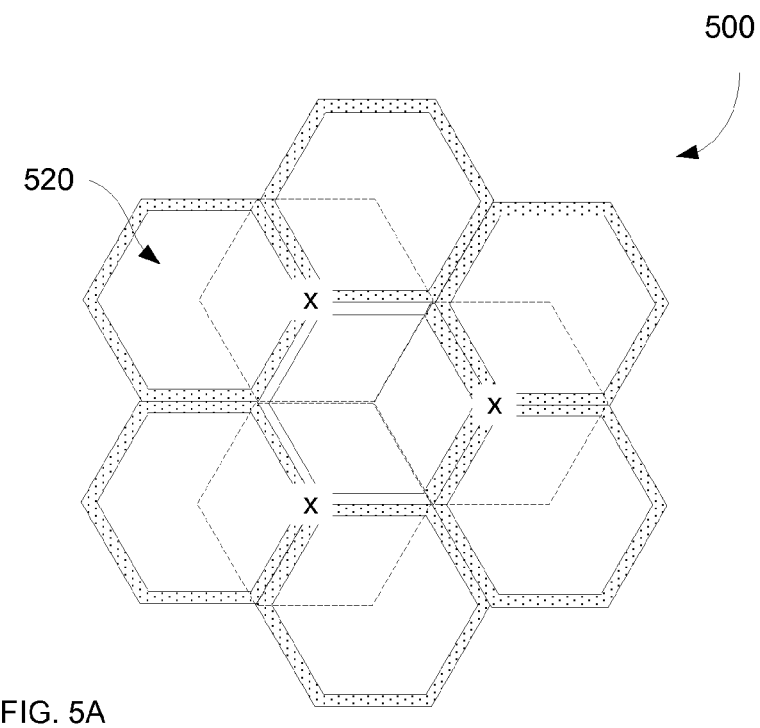
FIGS. 5A and 5B illustrate views of an "upstream" face (FIG. 5A) and "downstream" face (FIG. 5B) of a substrate according to some embodiments.
Figure 5B:
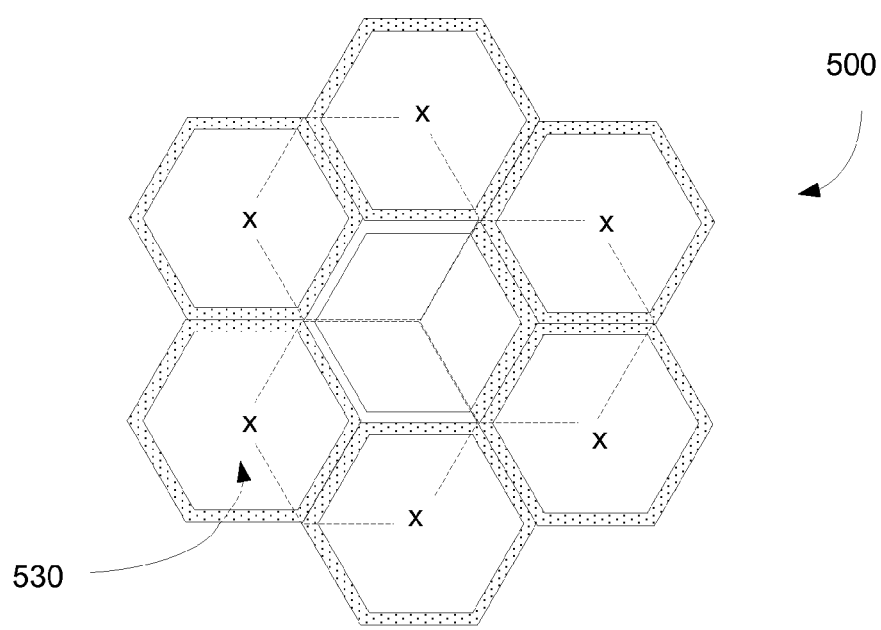

FIGS. 5A and 5B illustrate views of an "upstream" face (FIG. 5A) and "downstream" face (FIG. 5B) of a substrate according to some embodiments. Substrate 500 may include upstream channels 520 and downstream channels 530. Porous channel walls may create a "transition region" (e.g., as illustrated in FIG. 4) between the channels, such that a fluid passes through substrate 500 by entering upstream channels 520, passing through channel walls into downstream channels 530, then exiting the substrate.

Figure 6:
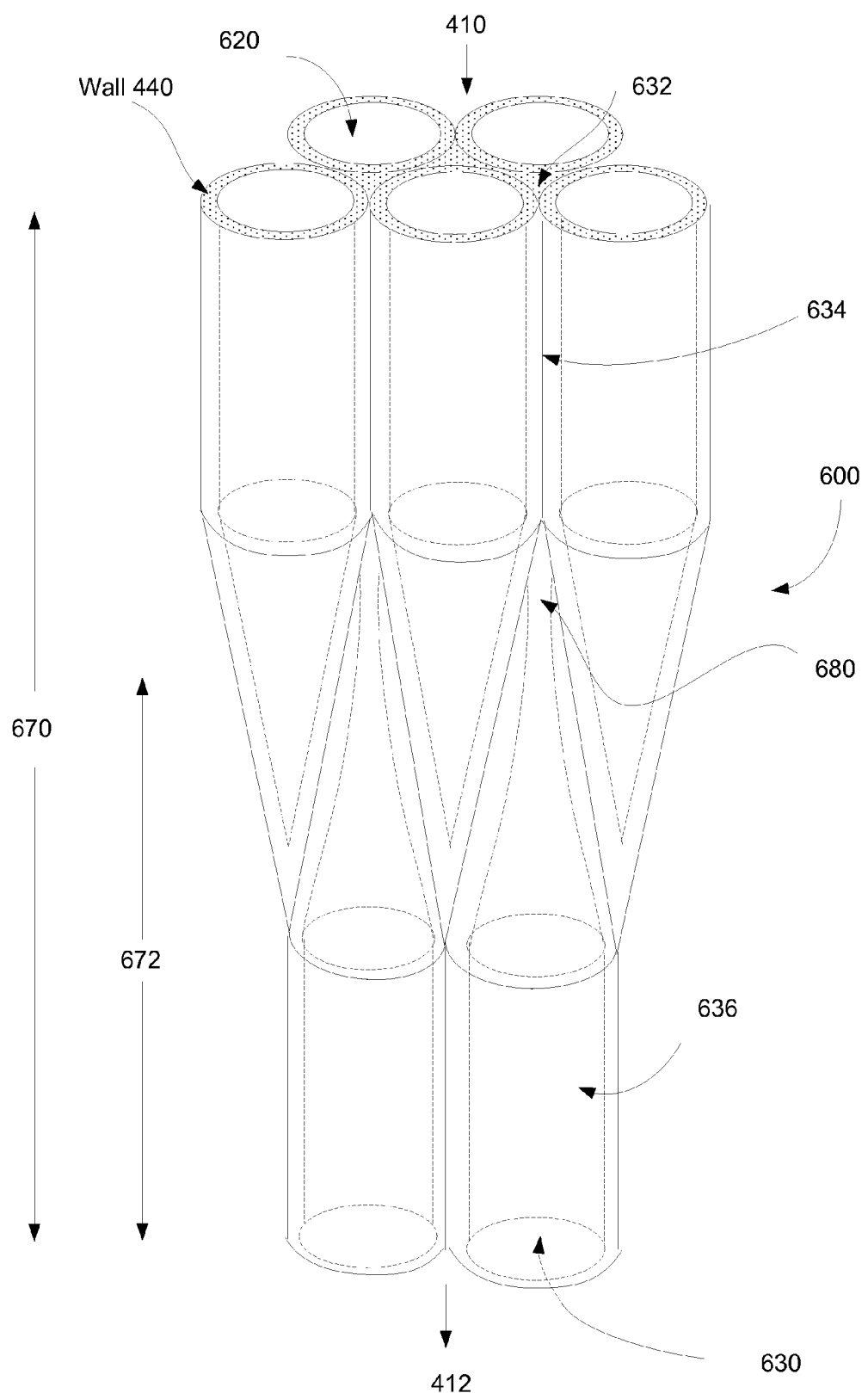
FIG. 6 illustrates a substrate according to some embodiments.

FIG. 6 illustrates a substrate according to some embodiments. Substrate 600 includes "upstream" channels 620, "downstream" channels 630, and may be disposed with respect to inlet 410 and outlet 412 as previously described. Substrate 600 may include upstream plugs 632, and/or have an upstream face having a hexagonal channel shape (e.g., as in FIG. 5A). Substrate 600 may be designed with downstream plugs similar to plugs 632. In this example, conical ends of upstream channels 620 may act as downstream plugs. Substrate 600 may be characterized as having "plugs" disposed a first distance 672 from a downstream end of substrate 600 in length 670. In some embodiments, particulate filtration may be concentrated to volumes of the substrate substantially "upstream" from the downstream end. First distance 672 may be approximately 10% of length 670, approximately 25% of length 670, approximately 50% of length 670, and/or approximately 75% of length 670. First distance 672 may approach length 670 (e.g., be over 90% or even over 95% of length 670).

Substrate 600 also illustrates a transition region in cross sectional area of a channel. In this example, a transition region 680 in downstream channels 630 is illustrated. Downstream channels 630 may include a first cross section 634 (in this case, approximately defined by the interstitial area between upstream channels 620). Downstream channels 630 may also include a second cross section 636 (in this case, larger cross sections toward the downstream end of substrate 600. Transition region 680 may generally describe a transition between first cross sections 432 and second cross sections 434.

In some embodiments, transition region 680 may be located approximately midway between upstream and downstream faces of substrate 600. In some embodiments, transition region 680 may be located within 10% of length 670 of either an upstream or downstream face of substrate 600. In some embodiments, transition region 680 may be located approximately 10%, 20%, 30%, 40%, 50%, 70%, 80%, or 90% along length 670.

Figure 7:
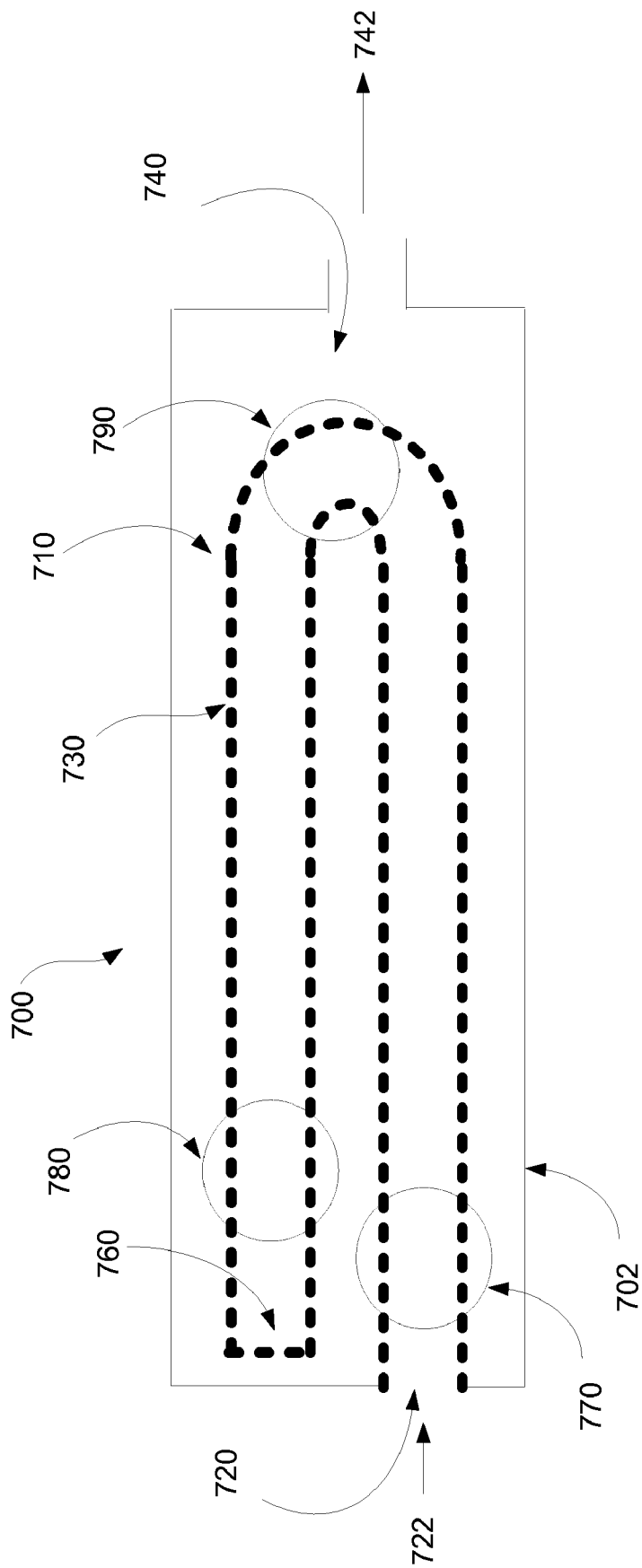
FIG. 7 illustrates a reactor according to certain embodiments.

FIG. 7 illustrates a reactor according to certain embodiments. Reactor 700 includes substrate 710 contained in a package 702. Substrate 710 has an upstream channel 720 in fluid communication with inlet 722. Channel 720 may be defined by a wall 730. In this example, downstream channel 740 is in fluid communication with outlet 742, and may be defined by wall 730 and package 702. Wall 730 may be porous, and may filter a fluid passing from upstream channel 720 through wall 730 into downstream channel 740.

Downstream plug 760 may form an "end" of upstream channel 720. For convenience, downstream plug 760 is referred to as "downstream" (e.g., with respect to fluid flow), although downstream plug 760 may be disposed at various points in reactor 700 (e.g., even at the upstream face of the reactor, as shown in FIG. 7). In some embodiments, upstream channel 720 may be shaped such that downstream plug 760 is proximate to inlet 722. For the purposes of this specification, proximate is defined as "close enough that an effect of being close is manifest."

In some embodiments, porosity, mean pore size, pore size distribution, channel cross section, wall thickness, tortuosity, and other factors may vary as a function of length along a channel. For example, a region 770 of wall 730 (close to inlet 722) may have a first pore size distribution, a region 780 of wall 730 (close to downstream plug 760) may have a second pore size distribution, and/or a region 790 (close to outlet 742) may have a third pore size distribution.

In some cases, these factors may be used to control permeability through a wall as a function of position in the reactor. In some cases, control of permeability may include control of the time dependence of the permeability (e.g., as soot loading in the channel increases). A region 780 may have a higher permeability than a region 790. A region 770 may have a higher permeability than a region 790.

In some filtration applications (e.g., as a particulate filter) wall 730 may be fabricated such that particulate loading begins close to downstream plug 760. With downstream plug 760 designed to be close to inlet 722 (e.g., proximate to the upstream side of reactor 700), soot loading may occur preferentially in regions of reactor 700 that reach oxidation temperatures quickly (as compared to regions proximate to outlet 742).

Certain components (e.g., substrates) may be fabricated from ceramics, such as SiC, Si3N4, cordierite, mullite, Al-titanates, and composites thereof. Substrates may be fabricated from fly ash. Substrates may have porosity ranging from 10-90%, including between 20 and 70%. Substrates may have a surface area greater than 10 square inches/gram, and may be greater than 100 square inches/gram, or even greater than 1000 square inches/gram. Some substrates (e.g., for filtration) may have a pore size distribution characterized by a median pore size and/or a mean pore size between 1 and 100 microns, including between 4 and 80 microns, and/or between 10 and 50 microns. Some walls (e.g., between channels) may have a permeability greater than $0.5E-12/m^2$, or even greater than $1E-12/m^2$, including greater than $10E-12/m^2$.

Figure 8:
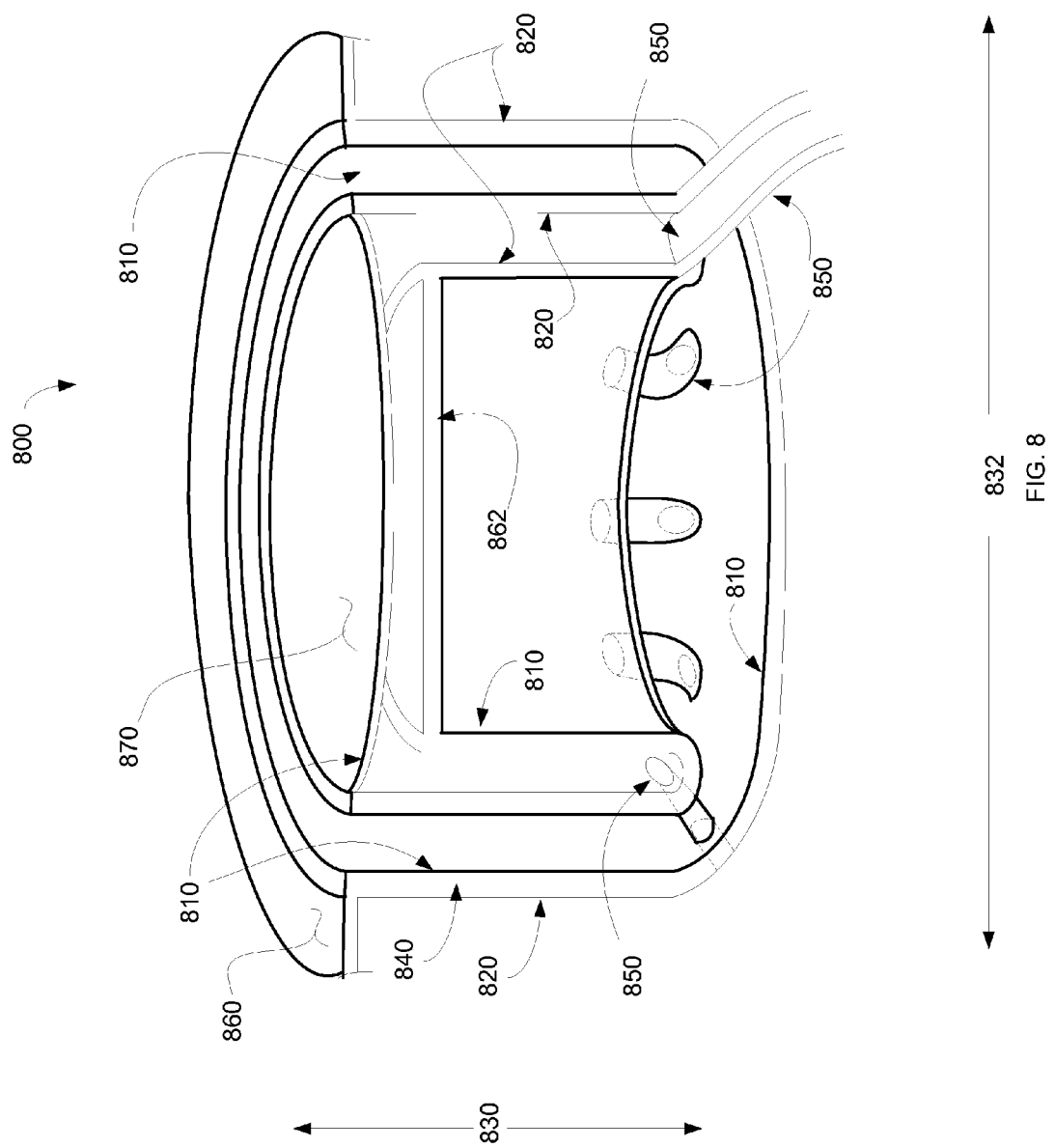
FIG. 8 illustrates a substrate according to some embodiments.

FIG. 8 illustrates a substrate according to some embodiments. Substrate 800 may include an "inlet surface" 810 (which may face an inlet) and an "outlet surface" 820 (which may face an outlet). For clarity, inlet surface 810 is shown with darker/bolder lines and outlet surface 820 is shown with lighter/finer lines. Substrate 800 may be characterized by a length 830, which may be substantially longer than a diameter 832. Walls 840 (e.g., porous walls) may separate (or define) inlet surface 810 from outlet surface 820.

In some embodiments, inlet surface 810 may be disposed facing in incoming fluid stream, outlet surface 820 may be disposed toward an outlet, and a fluid may be treated by passing through walls 840. Channel exits 850 may facilitate a passage of treated fluid from interior regions of substrate 800 to an outlet.

In some aspects, portions of substrate 800 may be shaped to alter fluid flow. For example, some upstream faces 860 of inlet surface 810. Some upstream surfaces 870 of inlet surface 810 may be concave. Downstream or side surfaces may also be shaped to modify fluid flow, and flow modifiers may be included. Substrate 800 may include a channel plug 862, which may be located proximate to an "upstream" face associated with fluid flow. A channel plug may be porous, and may have a similar or different porosity than other portions of the channel.

Figure 9:
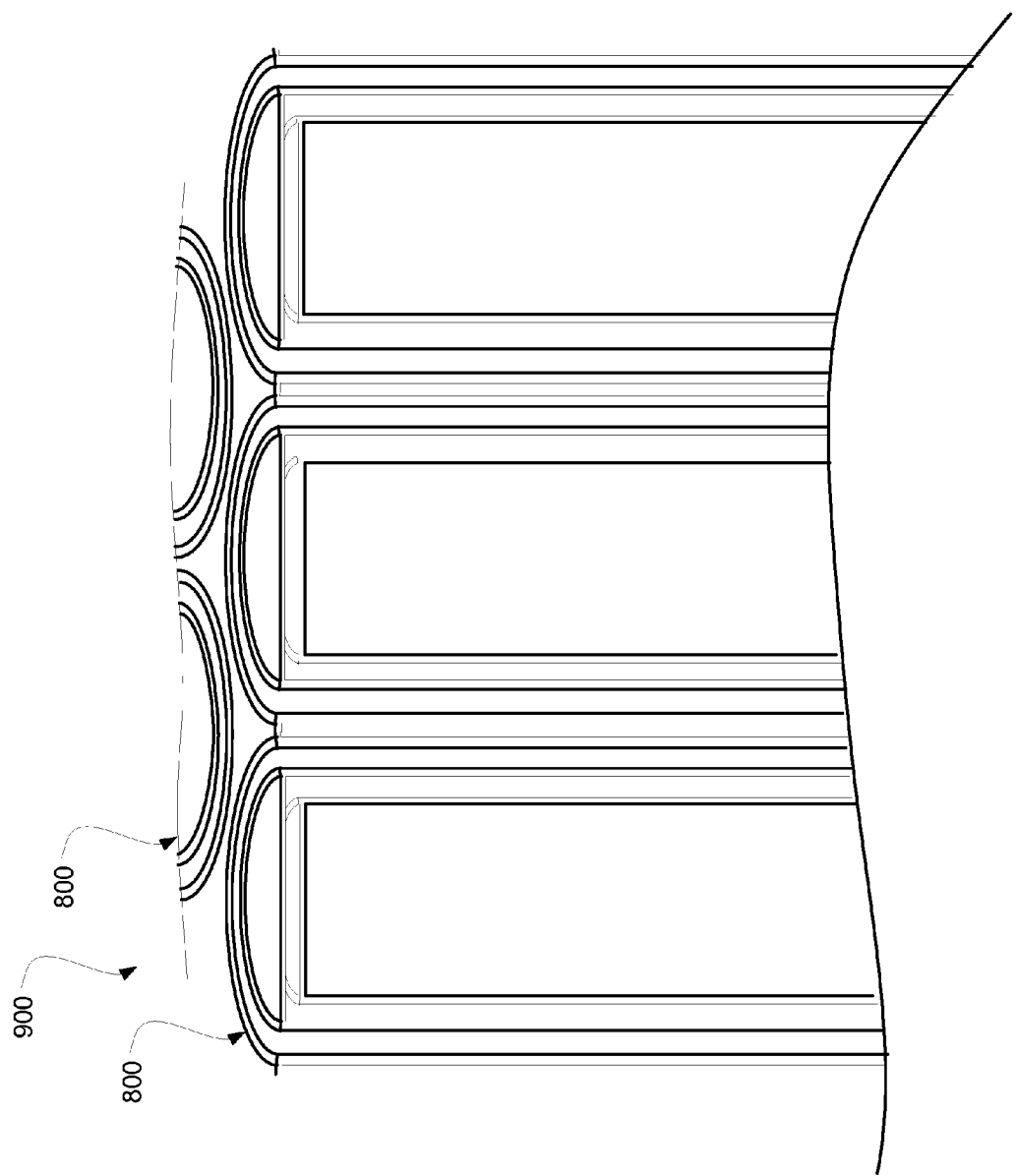
FIG. 9 illustrates an exemplary array, according to some embodiments.

FIG. 9 illustrates an exemplary array, according to some embodiments. Substrate 900 may include an array (and/or other plurality) of similarly shaped components (e.g., a plurality of substrates 800). The example of FIG. 9 demarcates upstream (bold lines) and downstream (fine lines) as in FIG. 8.

Figure 10:
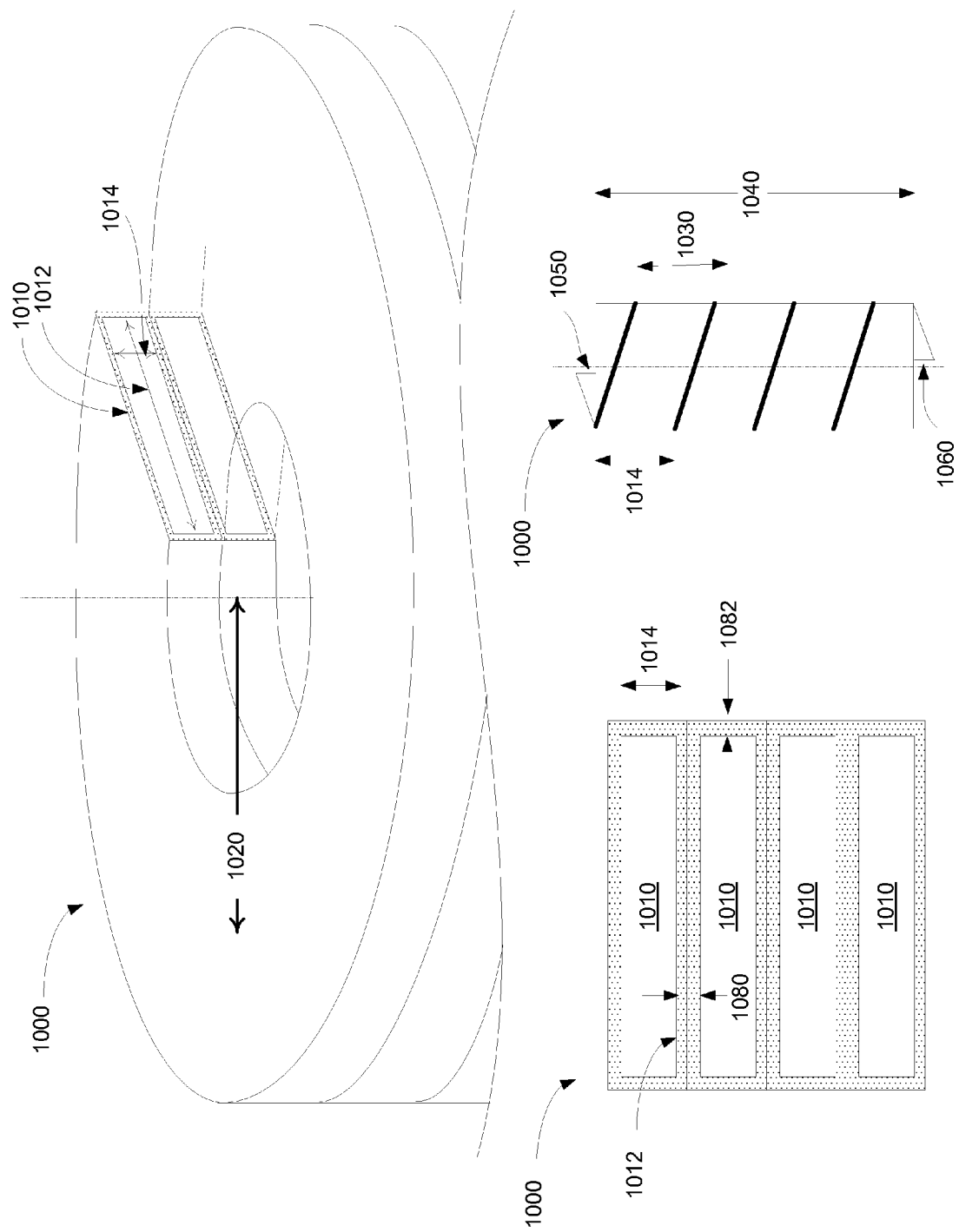
FIG. 10 illustrates an exemplary substrate, according to some embodiments.

FIG. 10 illustrates an exemplary substrate, according to some embodiments. Substrate 1000 includes channel 1010, which may approximate a helix having a radius 1020 (in this case, to a center of channel 1010), a pitch 1030, and a length 1040. Openings 1050 and 1060 to channel 1010 may be shaped and oriented as desired. For example, openings 1050 and/or 1060 may "face" outward with respect to the helix (facing in a direction other than parallel to the helical axis, e.g., as shown in FIG. 10). Openings 1050 and/or 1060 may face in the helical direction (e.g., "face" a fluid stream arriving at substrate 1000 from a direction substantially parallel to the helical axis).

A channel width 1012 and height 1014 may be chosen in combination with pitch 1030 to control a flow rate through the channel. For example, a smaller pitch may be used to reduce flow rate; a larger pitch may increase flow rate. A ratio of channel volume to channel surface area may be controlled by the ratio of height 1014 to width 1012. In some embodiments, height 1014 and width 1012 are approximately equal. In some embodiments, width 1012 is larger than height 1014 (e.g., 2×, 5×, 10×, 100×, or even 1000× larger). In some embodiments, height 1014 is larger than width 1012. In some cases (e.g., for small pitches 1030), the length of channel 1010 may be much greater than length 1040 of a reactor, which may provide for increased contact time between a fluid being treated (passing from inlet opening 1050 to outlet opening 1060). An increased residence time may result in a greater amount of heat being transferred from a fluid to the reactor. In some cases, a catalyst 1012 may be disposed on a surface of channel 1010. In some embodiments, a first wall thickness 1080 between adjacent channels 1010 is different than a separate wall thickness 1082 associated with a wall between channel 1010 and the "outer volume" of a reactor containing substrate 1000. In some cases, wall thickness 1082 is substantially thicker (e.g., twice, five times, or even ten times thicker) than wall thickness 1080.

Figure 11:
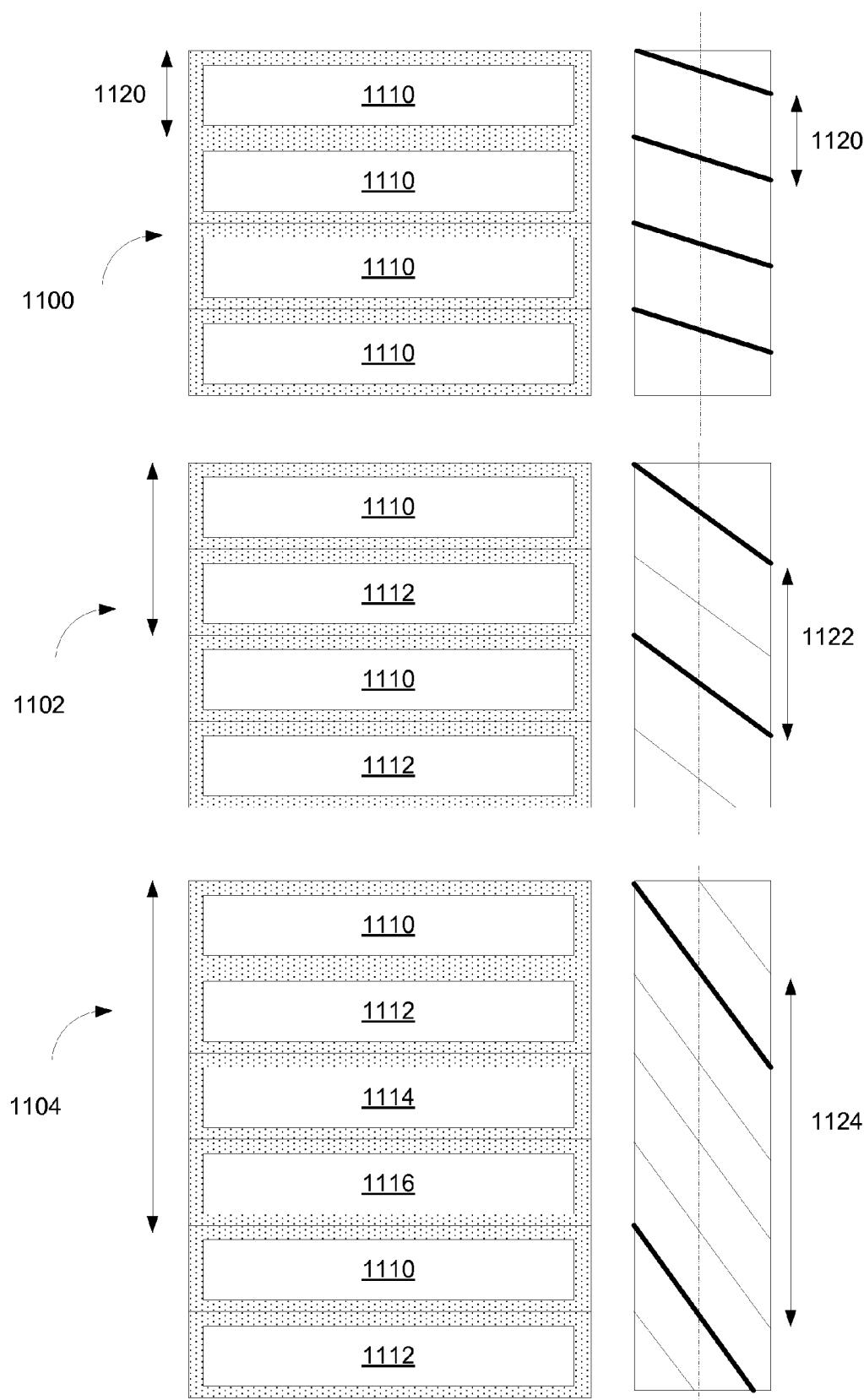
FIG. 11 illustrates several substrate channel configurations, according to various embodiments.

FIG. 11 illustrates several substrate channel configurations, according to various embodiments. Substrates 1100, 1102, and 1104 may be helical substrates (e.g., as described in FIG. 10), and illustrate (inter alia) different channel numbers and different pitches (although number of channels and pitch may be independently controlled). Substrate 1100 may include a single channel 1110, and be defined by a first pitch

1120. Substrate 1102 may include two parallel channels 1110 and 1112, and may be defined by a second pitch 1122. Substrate 1104 may include four parallel channels 1110, 1112, 1114, and 1116, and may be defined by a third pitch 1124. In some embodiments, pitch may be controlled independently of channel dimension (e.g., height 1014, FIG. 10) by varying a number of parallel channels. The number of parallel channels, pitch of the channels, and surface area to volume ratio of the channels may be chosen according to various requirements of an application (e.g., chemical reaction and/or residence time, heat transfer properties), typically in conjunction with the mechanical, thermal, and chemical properties of the material(s) used for the substrate. Openings to various channels may be shaped and oriented according as desired.

Figure 12:
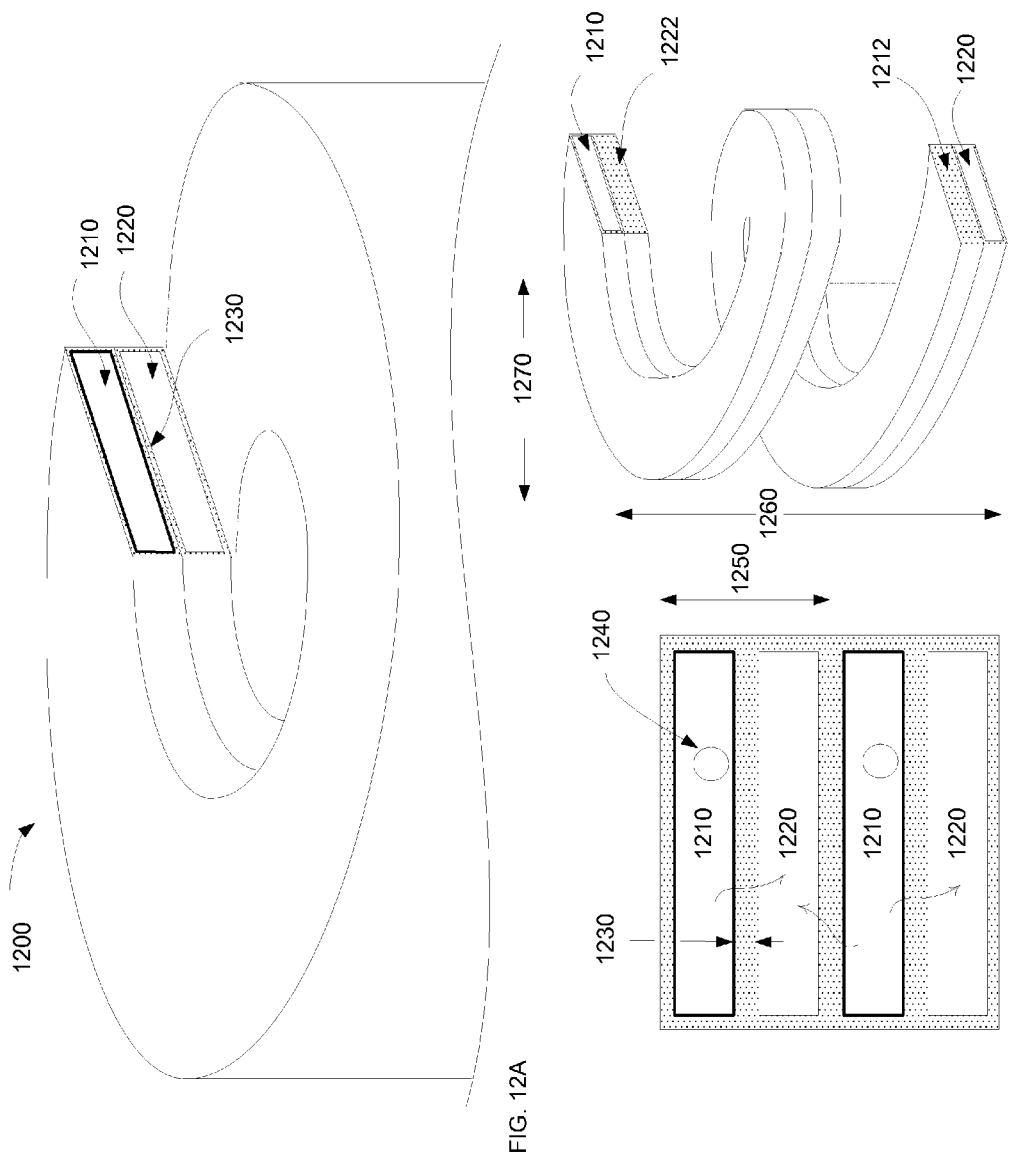
FIGS. 12A-C illustrate different aspects of a substrate that may be used for (inter alia) filtration, according to some embodiments.

FIGS. 12A-C illustrate different aspects of a substrate that may be used for (inter alia) filtration, according to some embodiments. Substrate 1200 may include a first channel 1210 and a second channel 1220, separated by a porous wall 1230. Channel 1210 may exposed to an inlet and plugged with a downstream plug 1212, and channel 1220 may be exposed to an outlet and plugged with an upstream plug 1222. A fluid flowing from inlet to outlet may enter channel 1210, pass through wall 1230 into channel 1220, and exit via the outlet to channel 1220. Substances (e.g., particles 1240) may be filtered from the fluid by wall 1230. Substrate 1200 may be characterized by a pitch 1250, a length 1260, a radius 1270 and various dimensions of channels. Substrate 1200 is shown "expanded" in length 1260 in FIG. 12C. In some cases, a first channel may have a larger cross sectional area than a second channel. Channel ratios of surface area to volume, channel shapes, number of channels, pitches of channels, and the like may be chosen according to a desired application.

Figure 13:
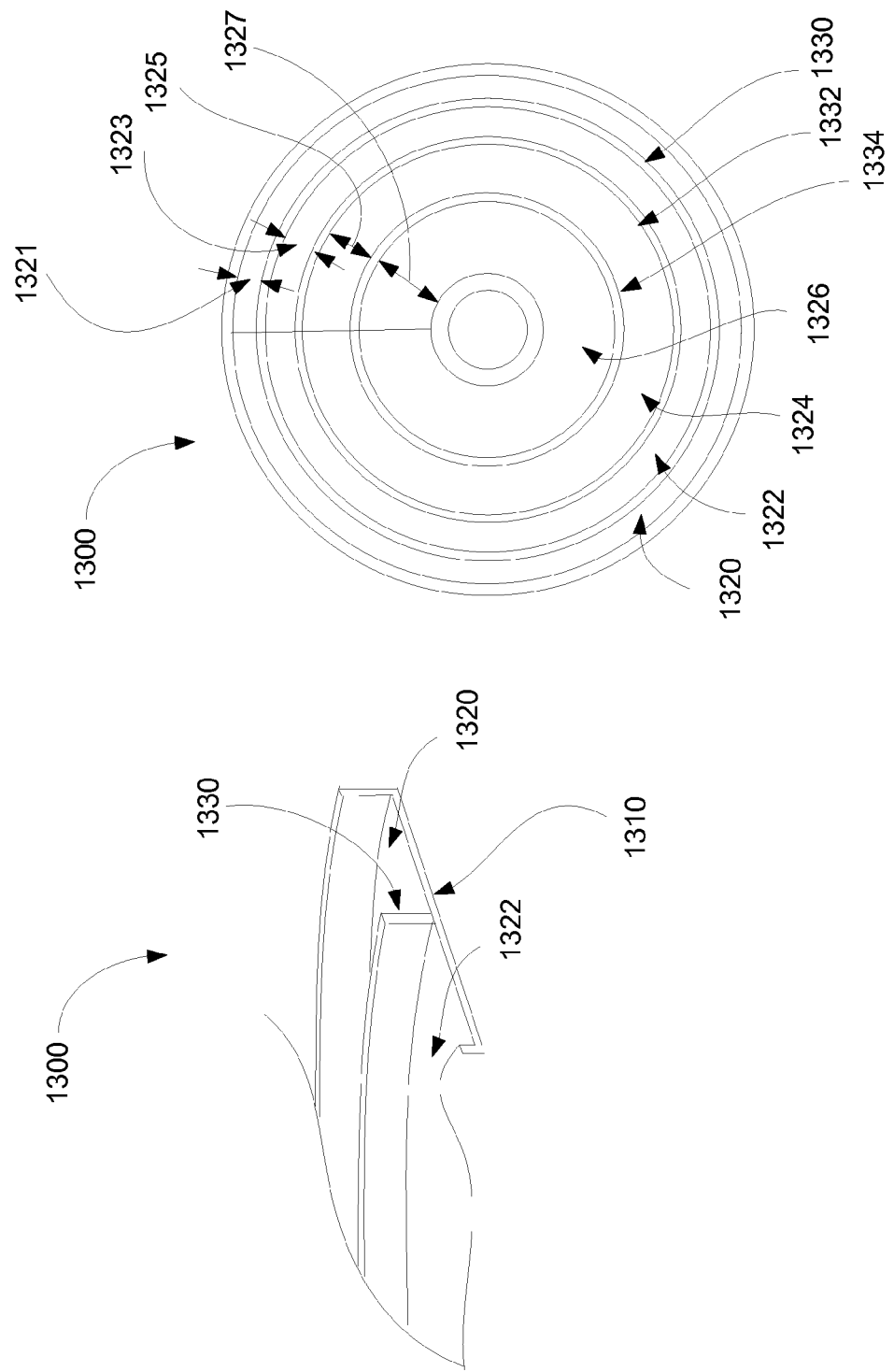
FIG. 13 illustrates various aspects of a channel, according to some embodiments.

FIG. 13 illustrates various aspects of a channel, according to some embodiments. A substrate 1300 (e.g., a helical substrate) may include one or more channels 1310. Channel 1310 may be divided into different subchannels 1320, 1322, 1324, 1326 by walls 1330. Subchannels may have similar or different cross sectional area and/or ratios of surface area to volume. Walls (e.g., walls 1330, 1332, and 1134) may be similar or different thicknesses. In some cases, the cross sectional area of each subchannel may be combined with a radius of each subchannel (and optionally pitch) to control the relative flow rates of fluids within the subchannels. In some cases, an "inner" channel may have a larger cross sectional area than an "outer" channel. For example, channel 1326 may have a width 1327, channel 1324 may have a width 1325, channel 1322 may have a width 1323, and channel 1320 may have a width 1321.

In some embodiments, the expected fluid flow properties may be used to calculate dimensions of various channels, and in some cases an "inner" channel having a tighter curvature may have a larger cross sectional area than an "outer" channel having a more gentle curvature. In some embodiments, an "outer" channel may have a pitch, curvature, and/or dimensions that result in preferential fluid flow through the outer channel vs. an "inner" channel. In some embodiments, an "inner" channel may have a pitch, curvature, and/or dimension that results in preferential fluid flow through the "inner" channel vs. an "outer" channel. "Inner" and "outer" channels may have different pitches (e.g., not be coplanar with respect to channel 1310 as shown in FIG. 11.

In some cases, a reactor and/or substrate design may include an expected deposition of particles (e.g., clogging), and an expected flow pattern may evolve as clogging increases. For example, substrate properties (e.g., channel shapes, sizes, and number) that result in an "outside-in" bias to a flow pattern. An unclogged substrate may cause fluid to preferentially flow through outer channels. As outer channels become clogged, fluid flow through inner channels may increase. In some cases, an unclogged substrate may cause fluid to preferentially flow through inner channels. As the inner channels become clogged, fluid flow through the outer channels may increase.

FIGS. 14A-D illustrate subchannels incorporating inward/outward flow, according to some embodiments. A channel may be curved (e.g., into a helix or ring) and may direct flow radially with respect to the curve. For example, channels 1400, 1402, 1404, and 1406 may include a plurality of subchannels 1410 defined by walls 1420. In some cases, fluid flow may be controlled to flow in a radial direction (e.g., inward toward the inside of the curve or outward toward the outside of the curve) in addition to (or even instead of) flow in a longitudinal direction with respect to a channel.

FIGS. 14A and 14B illustrate channels 1400 and 1402, and show two designs in which fluid may pass radially (from inside to outside, outside to inside, or in combinations). For example, FIG. 14A illustrates radial flow from an exterior 1401 of a substrate having a helical or ring shaped channel to an interior 1403 of substrate having a helical or ring shaped channel, and FIG. 14B illustrates radial flow from interior 1403 to exterior 1401. In some embodiments, a first channel includes walls to cause a fluid to pass inward, and a second channel includes walls to cause a fluid to pass outward. Inward and outward channels may be parallel. A reactor may include (in some examples), a first helical channel having a structure as in channel 1400 and a second helical channel having a structure as in channel 1402. Some embodiments include a combination of channels or substrates, arranged such that a fluid enters a first channel, is treated (e.g., reacted) in a first manner and exits the first channel into a second channel. The second channel may be proximate to the first, which may provide for heat transfer between the channels. In some cases, the fluid is treated in a second manner in the second channel.

Some embodiments include a first channel and second channel separated by a porous wall. A fluid may be filtered upon passing from the first to second channels via the porous wall. The second channel may be configured to treat the filtered fluid. In some cases, a first channel mitigates a first contaminant (e.g., hydrocarbons), and a second channel mitigates another contaminant. In some cases, a first channel mitigates NOx and a second channel mitigates particulate matter.

FIGS. 14C and 14D illustrate helical channels having plugs, which may be porous and/or combined with porous walls between channels (e.g., for filtration). In FIG. 14C, channel 1404 may include an inlet (or outlet) 1414 to the "outside" of the helix, and "inside" plugs 1424, which may prevent passage (e.g., of particles) from the interior volume of the helix to plugged channels. In FIG. 14D, channel 1406 may include an inlet (or outlet) 1416 and "outside" plugs 1426, which may prevent passage (e.g., of particles) from the outside of the helix to the plugged channels. Walls, tops, bottoms, plug, and other surfaces may be fabricated from porous materials.

In an exemplary embodiment, a helical reactor incorporates a first channel as in channel 1404 adjacent to a second channel as in channel 1406. Channels 1404 and 1406 may be separated by a porous wall. Fluid may pass through inlet 1414 in fluid communication with an inlet of the reactor, through the walls into adjacent channels 1406, then exit the channels 1406 via outlets 1416 to the interior of the helix. In such a configuration, "filtration" may occur primarily in a direction normal to the page of FIGS. 14A-D, and may also occur at the inside and outside plugs. In some embodiments, the interior of the helix may be in fluid communication with an outlet of the reactor. In some embodiments, the interior of the helix may be in fluid communication with inlets of additional channels (e.g., channels configured for another type of reaction). A distribution, shape, spacing and/or number of inlets and/or outlets may vary as a function of position along a channel, position in a substrate, expected reaction, expected temperature profile, and the like. For example, inlets 1414 may be preferentially concentrated at one end of a substrate (e.g., an end facing an inlet and/or an end facing an outlet).

Figures 15A, 15B:
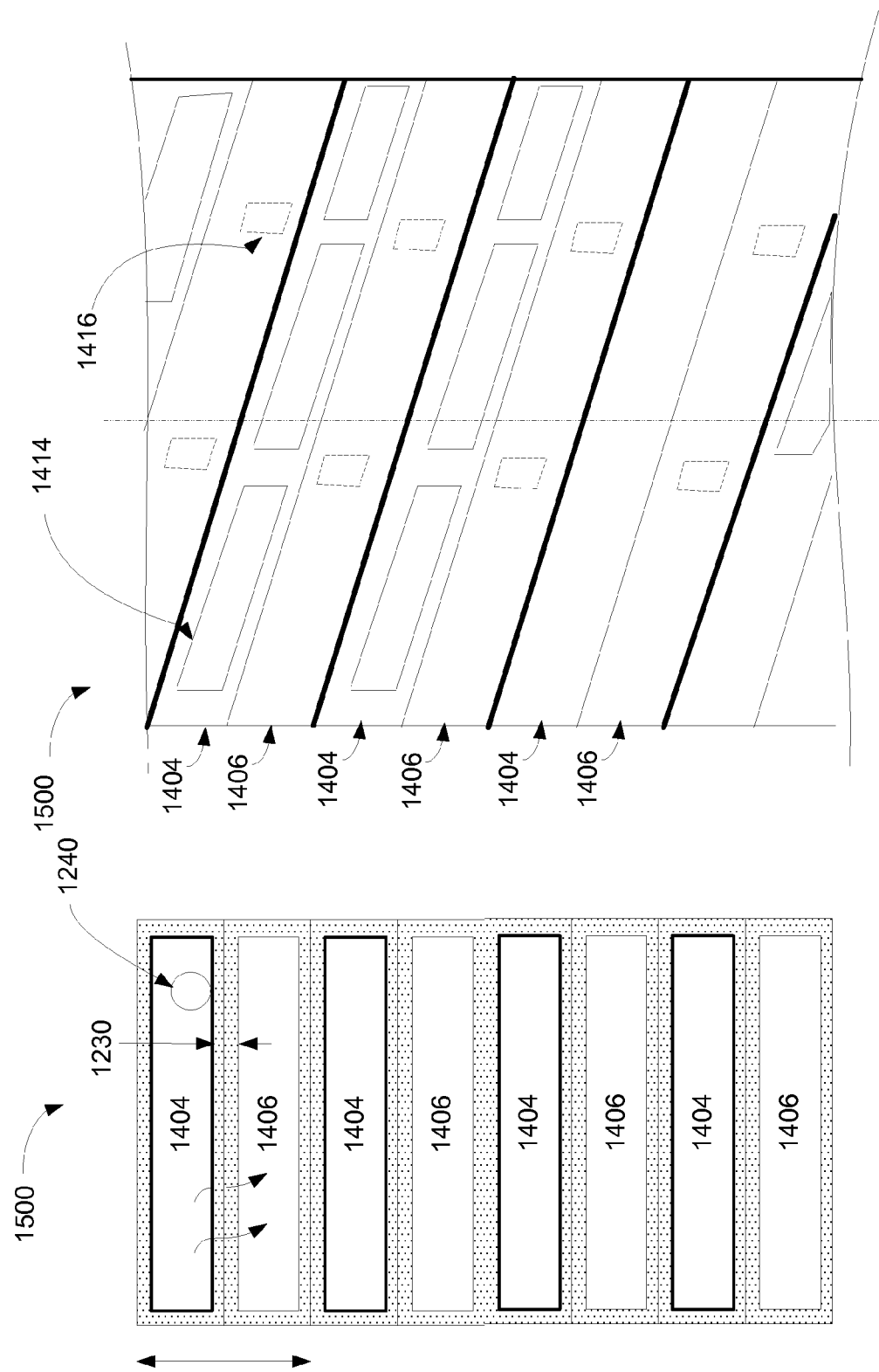
FIGS. 15A and B illustrate a substrate, according to some embodiments.

FIGS. 15A and B illustrate a substrate, according to some embodiments. Substrate 1500 may include channels such as channel 1404 and channel 1406 as described in the context of FIGS. 14C and D. FIG. 15 illustrates an exemplary reactor 1500 showing a plurality of inlets/outlets 1414 (on the "outside" of the helix) and 1416 (on the "inside" of the helix). The description "inlet" and "outlet" is for convenience; a substrate may be oriented "backwards" in some embodiments (e.g., the same configuration may provide for "inward" flow or "outward" flow).

Figure 16:
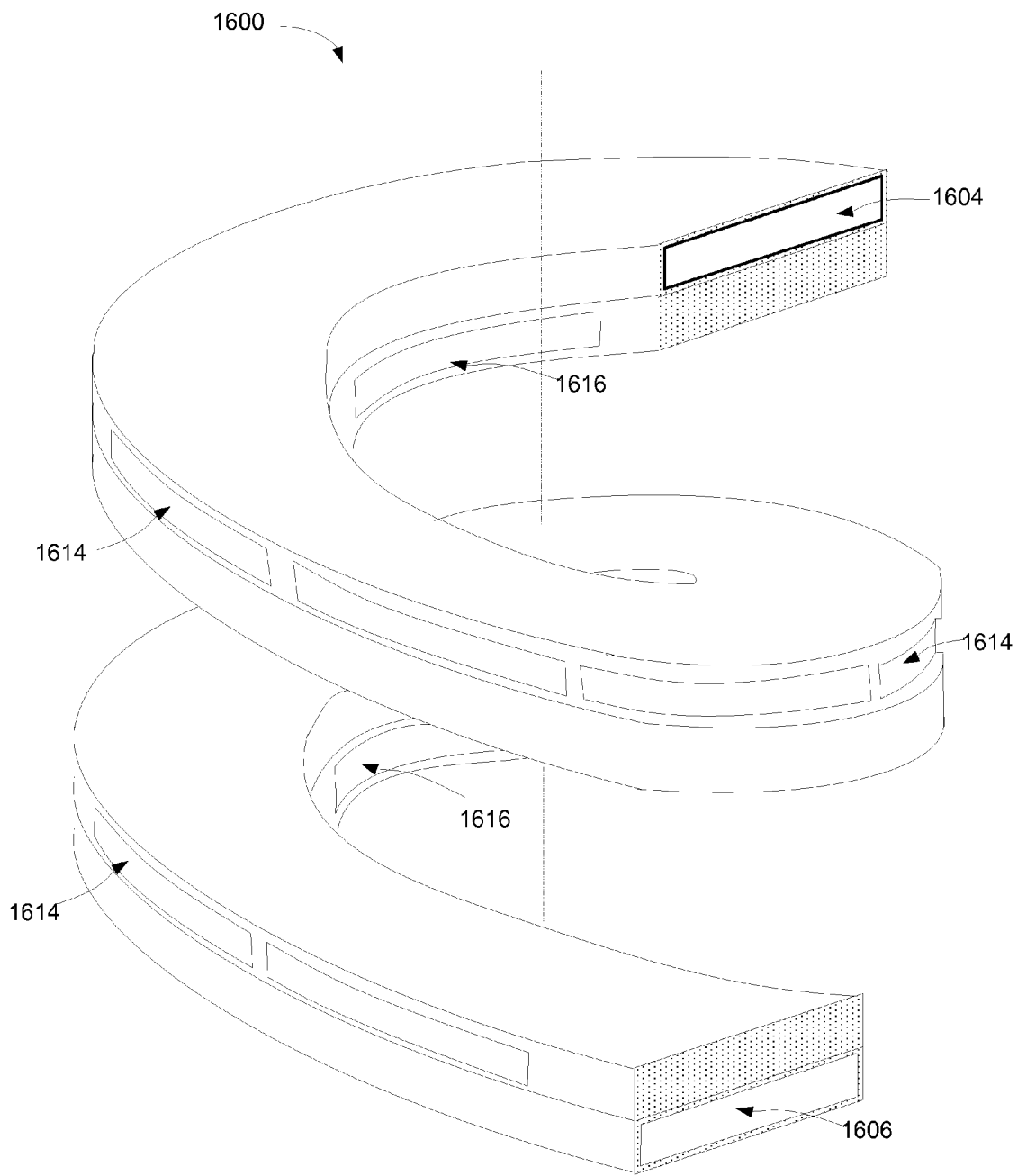
FIG. 16 illustrates an expanded view of a helical reactor, according to some embodiments.

FIG. 16 illustrates an expanded view of a helical reactor, according to some embodiments. Reactor 1600 may include a channel 1604 in fluid communication with an inlet (or alternately, an outlet) via inlets 1614, and a channel 1606 in fluid communication with an outlet (or alternately, an inlet) via outlets 1616. A fluid may be treated (e.g., filtered) in passage from channel 1604 to channel 1606.

Figure 17A:
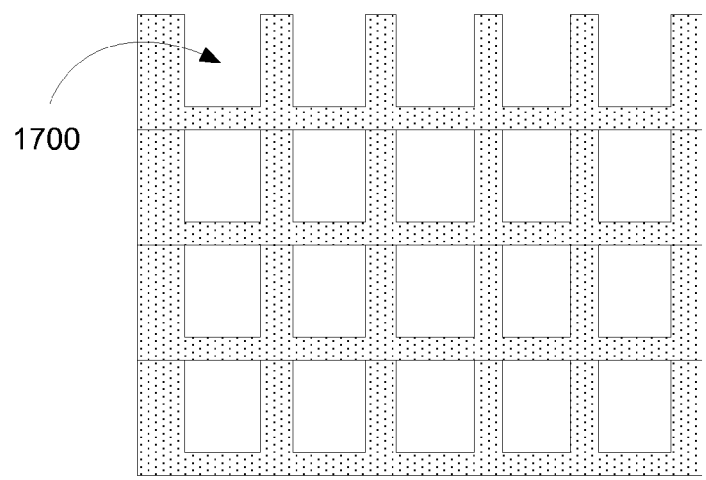
FIGS. 17A-C illustrate several channel designs, according to some embodiments.
Figure 17B:
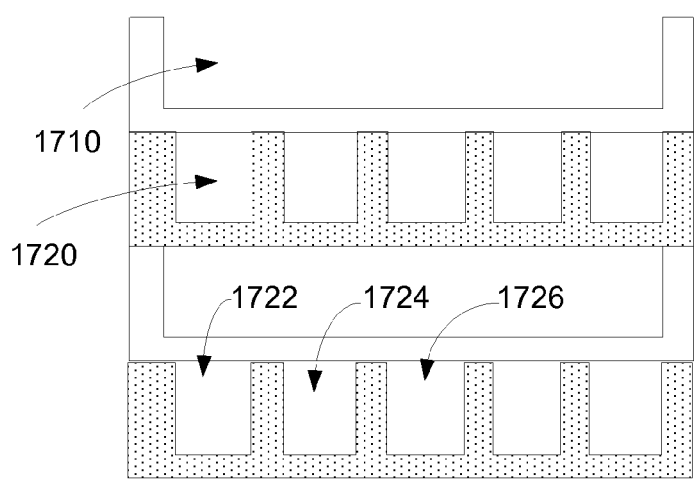
Figure 17C:
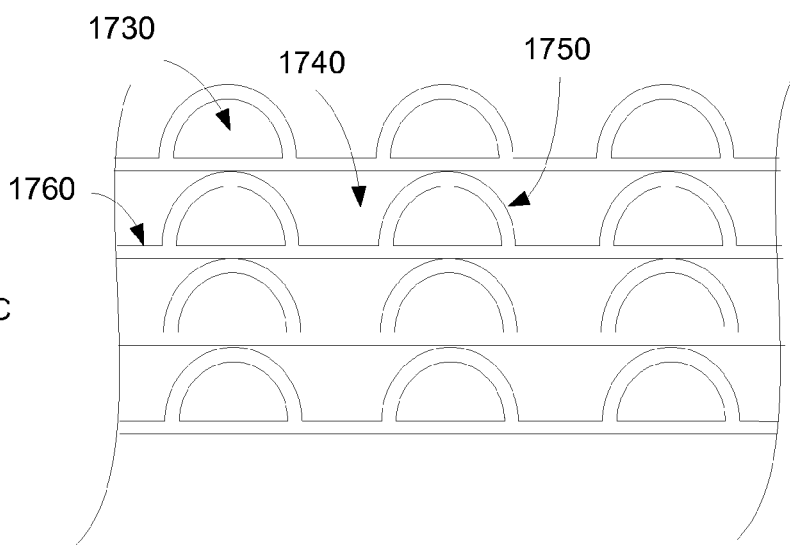

FIGS. 17A-C illustrate several channel designs, according to some embodiments. FIG. 17A illustrates a substrate with channels 1700 disposed in a "checkerboard" pattern (as viewed "along" the channel direction). FIG. 17B illustrates a substrate having a first channel 1710 comprised of a first material and a second channel 1720 comprised of a second material. FIG. 17B also illustrates different channels having different subchannel arrangements; in this example, second channel 1720 includes a plurality of subchannels 1722, 1724, 1726, and the like. FIG. 17C illustrates channels having concave and convex cross sections, and illustrates channels having different cross sectional areas and shapes. In this example, first channels 1730 have a first shape, and second channels 1740 have a second shape (which may be "complementary" to the first shape, or shaped according to the space "between" the first channels 1730). In some cases, a first wall 1750 between channels 1730 and 1740 may be porous. In some cases, a second wall 1760 between adjacent channels 1760 may be a different material than a material of first wall 1750. In some embodiments, channels 1730 may be in fluid communication with an outlet of a reactor and channels 1740 may be in fluid communication with an inlet to a reactor.

Two or more substrates may be connected to form a third substrate. Two or more channels may be connected to form a combination of channels. In some cases, reactors may be "integrated" by providing a first channel that performs a first reaction and a second channel that performs a second reaction. Heat and mass transfer calculations may be used to determine a combination of geometrical and materials factors that may result in an integrated reactor using available heat and/or chemicals from a first reactor to improve a reaction in a second reactor.

Figure 21:
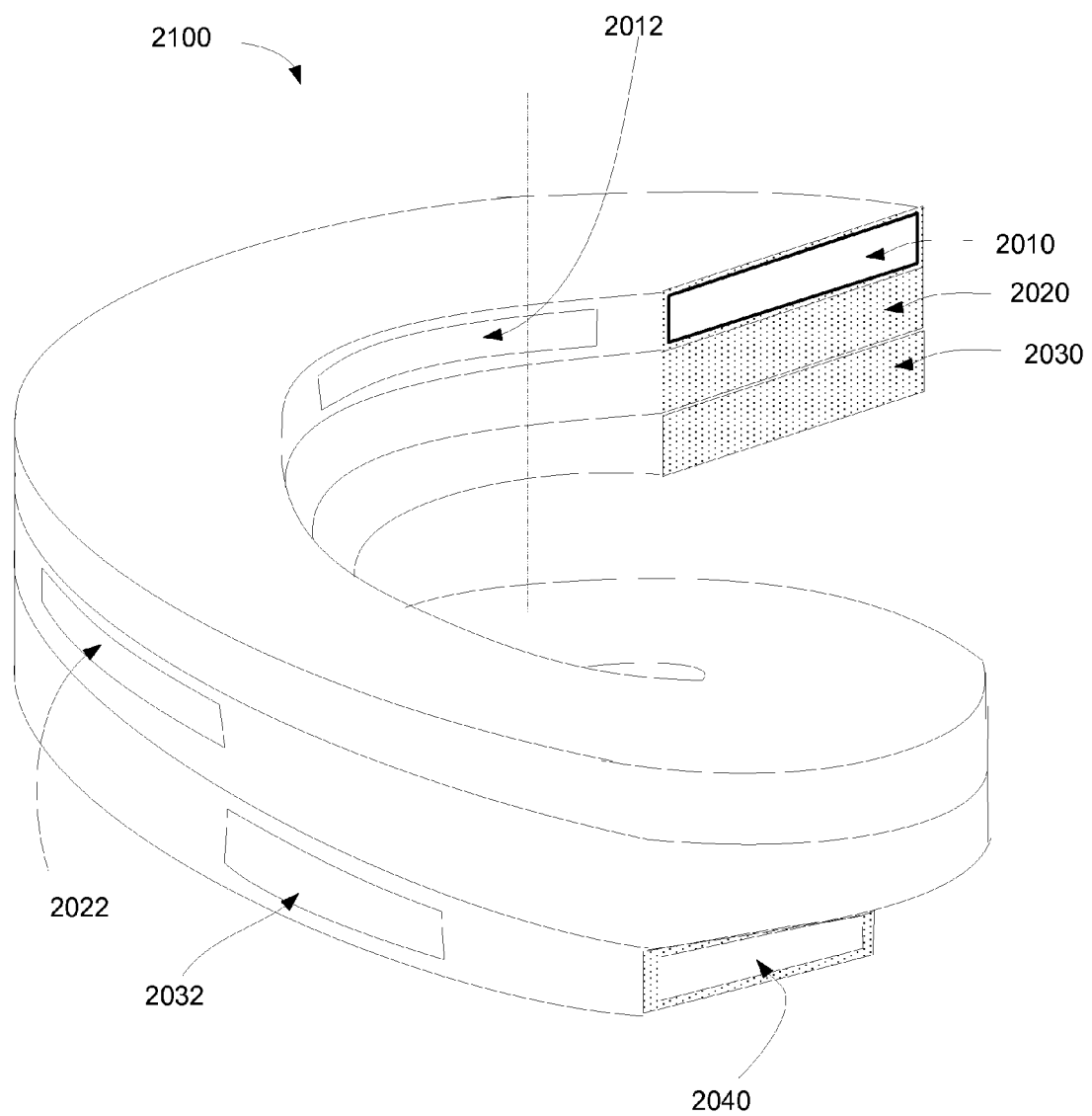
FIG. 21 illustrates a three channel substrate, according to some embodiments.

FIG. 21 illustrates a three channel substrate, according to some embodiments. Substrate 2100 may include helical channels 2010, 2020, and 2030. In this example, an interior of the helical substrate 2100 may be in fluid communication with an inlet to a reactor containing the substrate. Inlets 2012 may allow for a fluid to pass from the inlet of the reactor to channels 2010. In this example, channels 2010 and 2020 may be separated by a porous wall. A fluid passing through channels 2010 may be filtered upon passing through the porous walls to channels 2020. The filtered fluid may exit channels 2020 via exterior outlets 2022. Channel 2030 may have exterior inlets in fluid communication with exterior outlets 2022. Filtered fluid may pass from outlets 2022 through inlets 2032 into channels 2030. In this example, channels 2030 may have an outlet 2040 at an end of substrate 2100.

Figure 22:
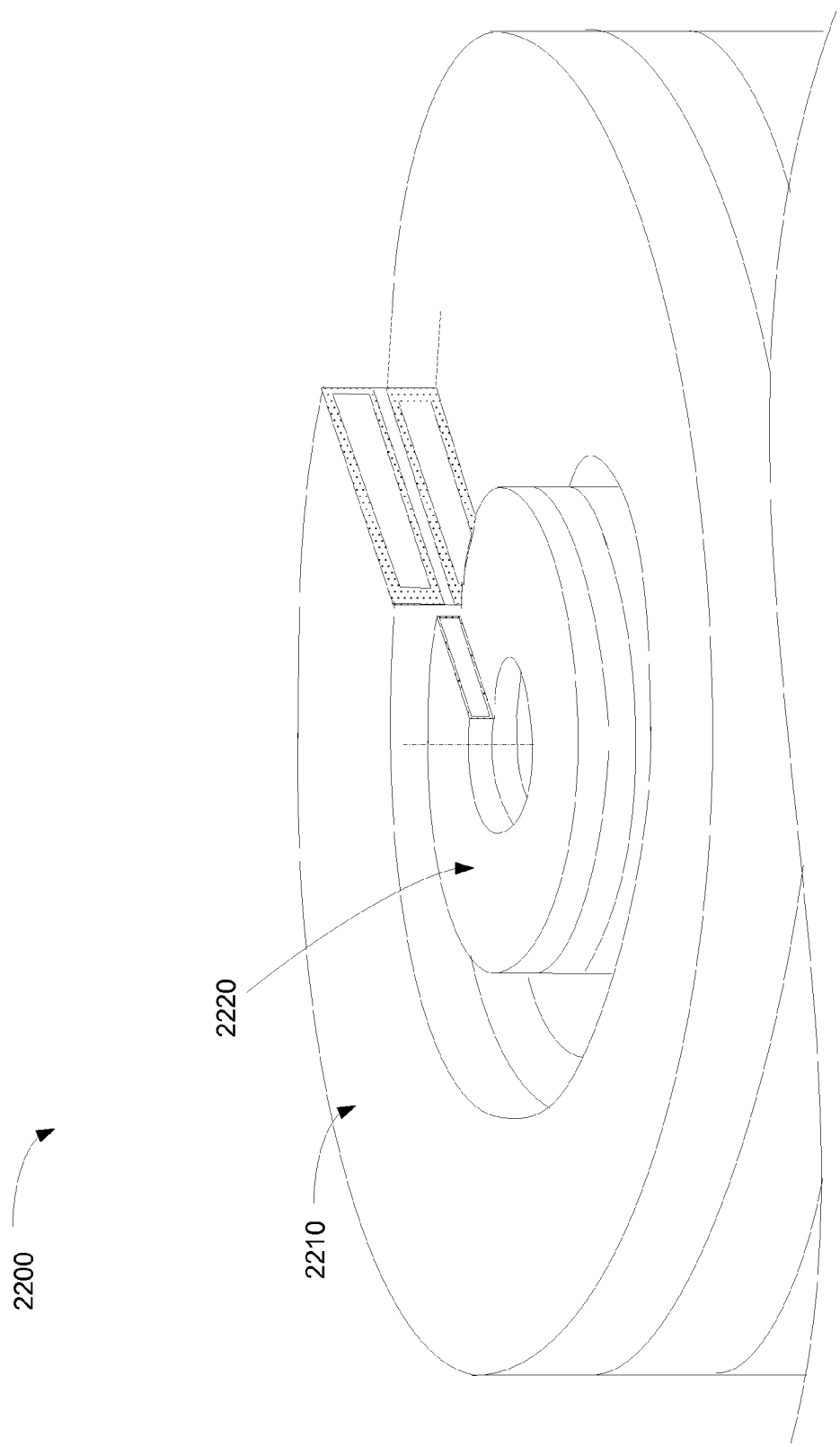
FIG. 22 illustrates a substrate combining two coaxial substrates, according to certain embodiments.

FIG. 22 illustrates a substrate combining two coaxial substrates, according to certain embodiments. Substrate 2200 may include first substrate 2210 and second substrate 2220. Inlets and outlets associated with various channels (not shown) may be arranged as desired. In some embodiments, inlets to channels in substrate 2210 are disposed on the "outside" of substrate 2210, and may be in fluid communication with an inlet. Outlets associated with channels in substrate 2210 may be disposed on the "inside" of substrate 2210, and may be in fluid communication with inlet channels associated with substrate 2220. Outlets from channels associated with substrate 2220 may be in fluid communication with the outlet of the reactor In some cases, one of the two substrates may be in fluid communication with an inlet to a reactor containing substrate 2200, and another substrate may be in fluid communication with an outlet of the reactor. An outlet to one of the substrates may be in fluid communication with an inlet of the other substrate.

Many reactors transfer heat to and from the environment. In some cases, heat transfer may proceed "radially" with respect to a helical substrate (e.g., a hot substrate loses heat to the environment in a radially "outward" direction. Some applications may benefit from "nesting" a first substrate within a second substrate. In some cases, fluid first flow through an outer first substrate, then flows through an inner second substrate. In some cases, fluid first flows through an inner first substrate, then flows through an outer second substrate. Fluid may flow through both substrates simultaneously. A first substrate may be configured to provide treatment under a first condition (e.g., a cold engine and/or stop/start operation) and a second substrate may be configured to provide treatment under a second condition (e.g., a hot engine and/or sustained, steady state operation).

Figure 18:
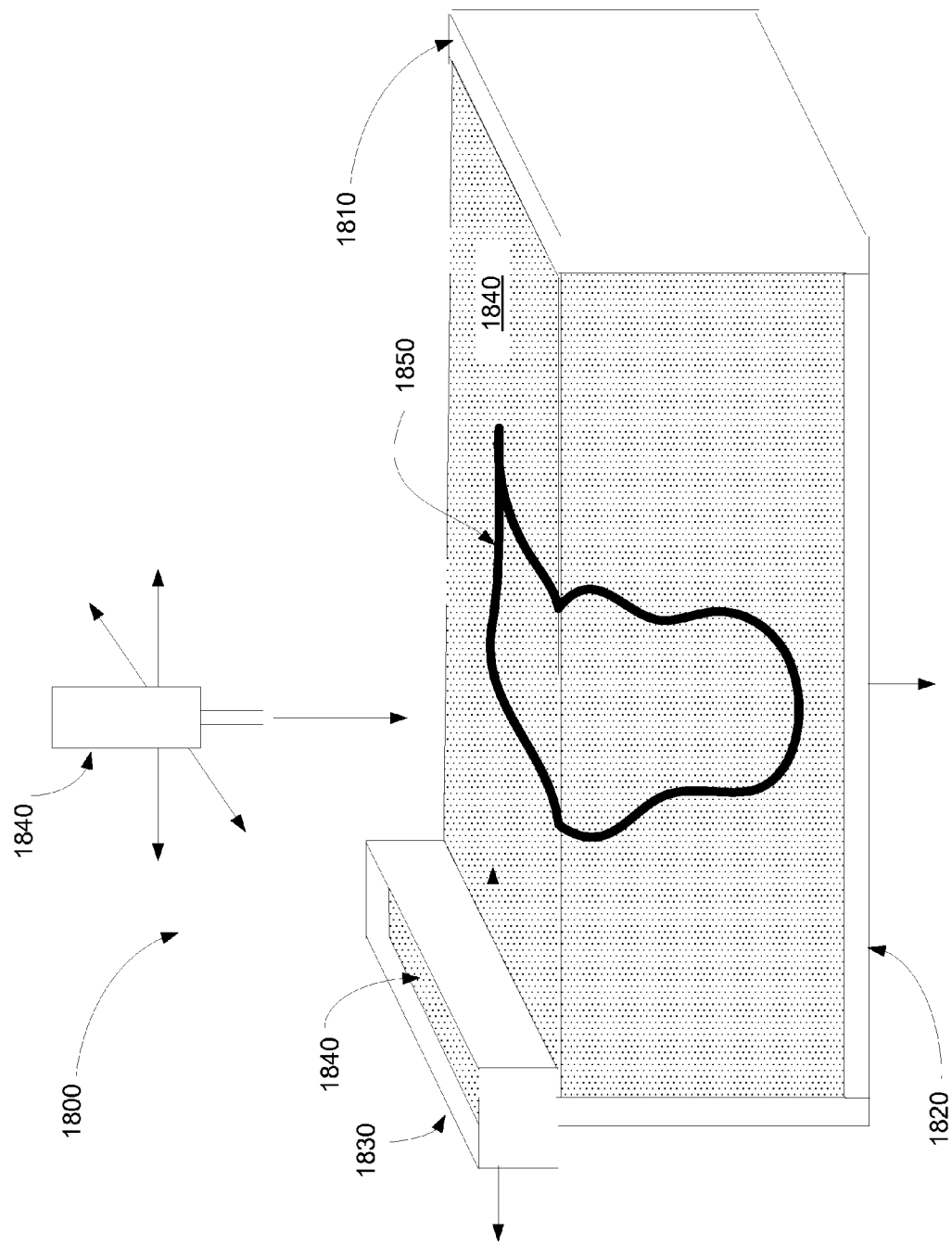
FIG. 18 illustrates a system that may be used to fabricate bodies (e.g., substrates), according to certain embodiments.

FIG. 18 illustrates a system that may be used to fabricate bodies (e.g., substrates), according to certain embodiments. System 1800 may include a container 1810 having a movable bottom 1820. A carrier 1830 may dispense a layer of precursor material 1840, which may include a ceramic, a metal, an ash, or other materials (typically particulate). A binder may also be incorporated into the precursor material, and may be dispensed by carrier 1830 (e.g., as a mixture of binder and precursor material powders). A binder may also be dispensed as a separate layer (e.g., sequential layers of binder and precursor material). A binder may include polyethylene, a thermosetting resin, polycarbonate, a sugar, a starch, and the like. A binder may include an organic powder that reacts with an activator (e.g., a solvent) to cause the binder to glue various other particles (e.g., ceramic particles) to each other. For example, a substrate may be fabricated from cordierite powder, which may be dispensed as a mixture with powdered sugar. An activator (e.g., water) may be preferentially deposited on portions of a layer of the mixture, bonding the cordierite powder in the activated portion.

A bonder 1840 (e.g., a laser for thermal bonding, an inkjet to apply a binder or activator, and the like) may be configured to bond the binder and precursor material 1840. Typically, bonding may create a solidified portion of precursor material 1840, shown as structure 1850. After bonding, bottom 1820 may descend a small amount (e.g., microns to millimeters), carrier 1830 may dispense another layer of precursor material 1840 (with or in addition to additional binder), and bonder 1840 may bond an additional portion of the new precursor material 1840, adding an additional layer to structure 1850. In some embodiments, structure 1850 may include a substrate, channel, and the like. In some cases, a binder may be omitted. Companies such as 3D Systems (Rock Hill, S.C.), The Ex-One Company (Irwin, Pa.) and Z-Corporation (Burlington, Mass.) may provide some equipment for fabricating reactors. Various methods may be used to fabricate refractory (e.g., metallic, ceramic, and the like) having porosity greater than 10%, greater than 20%, greater than 30%, greater than 40%, or even greater than 50%.

Printing methods (e.g., inkjet printing) may also be used to form reactors. For example, a bonder 1840 may provide for spatially controlled deposition of a precursor material (e.g., as in an inkjet printing head). Tape casting may be used for some embodiments.

Figure 19:
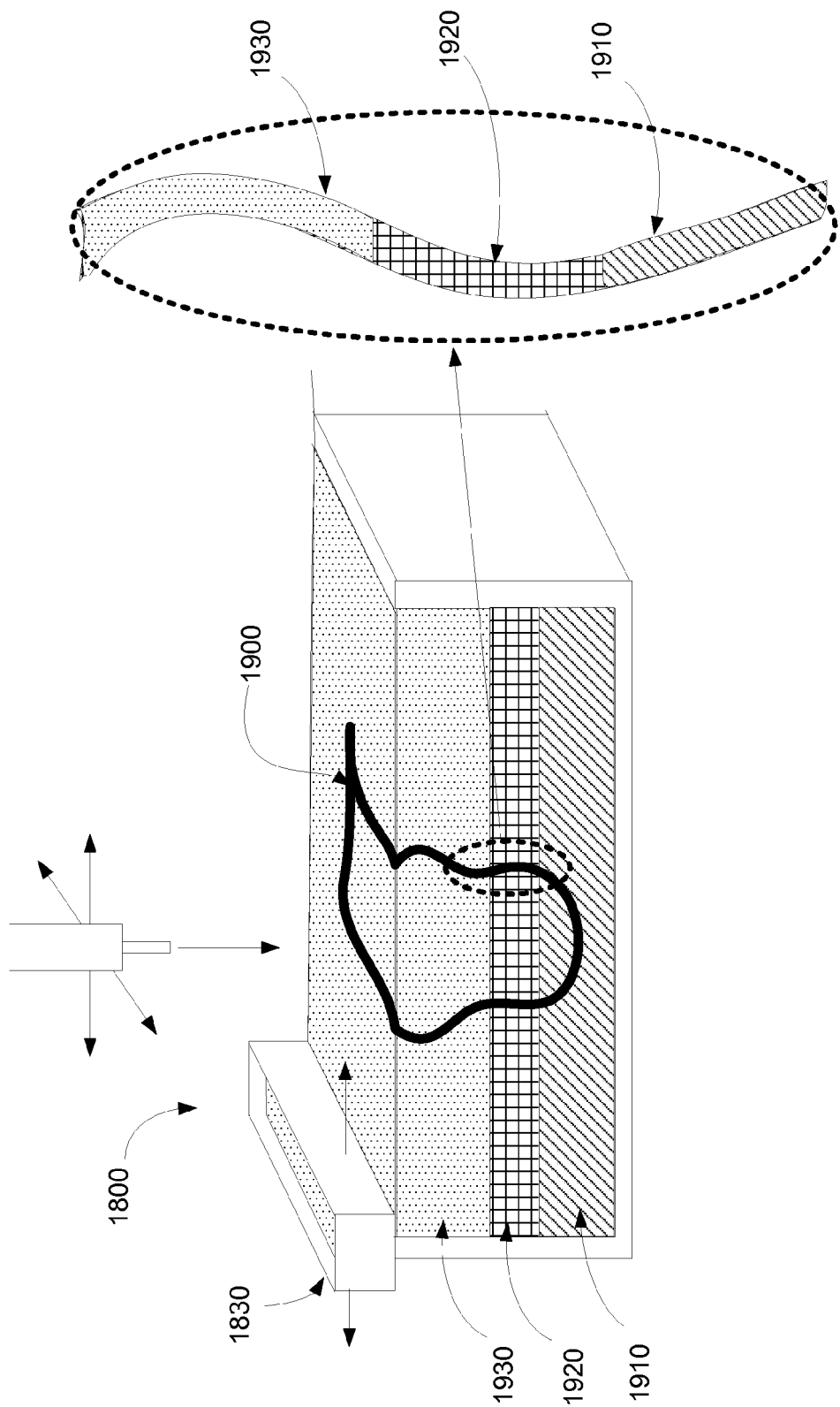
FIG. 19 illustrates fabrication method that may be used to fabricate a body comprised of different materials, according to some embodiments.

FIG. 19 illustrates fabrication method that may be used to fabricate a body comprised of different materials, according to some embodiments. Inclusion of different materials in a body (e.g., a substrate) may provide for functional control of materials properties (e.g., different regions of a reactor have different materials properties). For example, substrate 1900 may require fabrication from different materials 1910, 1920, and 1930. Materials 1910, 1920, and 1930 might have different particle sizes, different particle size distributions, different chemical compositions, include different binders, have different catalytic properties, have different permeability's, or have differences and/or similarities in other factors.

Fabrication of substrate 1900 may include changing the precursor material delivered by carrier 1830 in system 1800. For example, a first part of substrate 1900 may be fabricating by delivering (e.g., layering) a first material 1910, a second part of substrate 1900 may be fabricated by delivering (e.g., layering) a second material 1920, and a third part of substrate 1900 may be fabricated by delivering (e.g., layering) a third material 1930. Changing precursor material as a function of layer may provide for functionally graded properties in a "z" or "vertical" direction of a reactor (with respect to fabrication according to system 1800).

Figure 20:
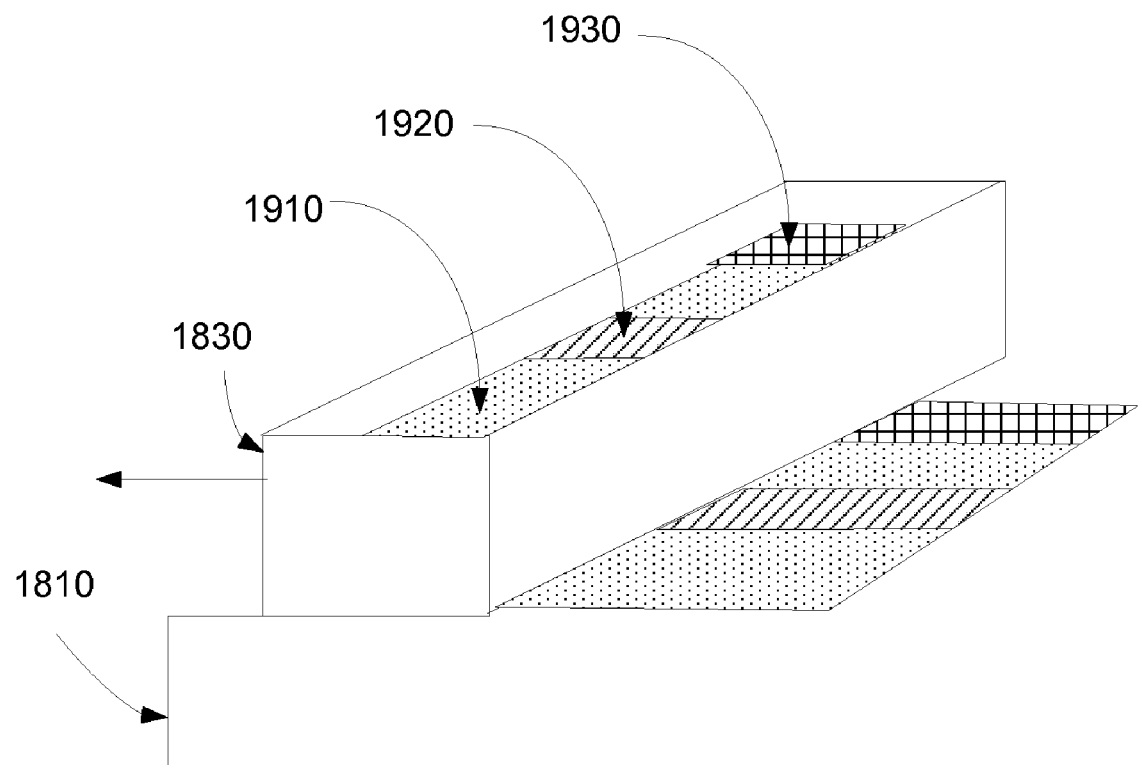
FIG. 20 illustrates a delivery of different materials (e.g., in the same layer), according to some embodiments.

FIG. 20 illustrates a delivery of different materials (e.g., in the same layer), according to some embodiments. Such delivery may include using carrier 1830 and system 1800. Carrier 1830 may include different materials 1910, 1920, and 1930, which may be delivered to fabricate a reactor having functionally graded properties in an "x" and/or "y" direction of a reactor (with respect to fabrication according to system 1800).

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A substrate for use in a reactor having an inlet and an outlet, a line from the inlet to the outlet defining a flow direction, the substrate comprising:
   a first end configured to be in fluid communication with the inlet;
   a second end configured to be in fluid communication with the outlet;
   a first channel within the substrate, the first channel having a shape that causes a fluid flowing through the first channel to take a second direction that deviates from the flow direction by at least 5 degrees, and
   a second channel separated from the first channel by a porous wall,
   wherein either of the first and second channels is in fluid communication with the inlet, and the other of the first and second channels is in fluid communication with the outlet.

2. The substrate of claim 1, wherein a primary flow field describes a predominant flow of a fluid flowing through at least one of the first and second channels, and the channel includes one or more flow modifiers shaped to induce a secondary flow field in a fluid flowing through the channel.

3. The substrate of claim 1, wherein the second direction deviates from the flow direction by an amount that does not exceed 90 degrees.

4. The substrate of claim 3, wherein the deviation is between 20 and 90 degrees.

5. The substrate of claim 1, wherein the flow direction and the second direction define a plane, and at least a portion of the first channel has a shape that causes the fluid flowing through the portion to follow a third direction that is not coplanar with the plane.

6. The substrate of claim 1, wherein at least a portion of at least one of the first and second channels forms a helix.

7. The substrate of claim 1, wherein at least a portion of at least one of the first and second channels is ring shaped.

8. The substrate of claim 1, wherein the substrate includes an interior volume, and either of the first and second channels includes an opening to at least one of the interior volume and an exterior of the substrate.

9. The substrate of claim 1, wherein the inlet is in fluid communication with either an interior of the substrate or an exterior of the substrate, and the outlet is in fluid communication with the other of the interior and exterior.

10. The substrate of claim 1, wherein at least one of the first and second channels describes a circular flow path around an interior of the substrate.

11. The substrate of claim 10, wherein the flow path in at least one of the first and second channels is clockwise and the flow path in at least one other of the first and second channels is counterclockwise.

12. The substrate of claim 1, wherein at least one first and one second channel describe a circular flow path around an interior of the substrate, and the flow paths in both the first and second channels are either clockwise or counterclockwise.

13. The substrate of claim 1, wherein at least one of the first and second channels is curved.

14. The substrate of claim 1, wherein at least one of the first and second channels is characterized by a flow direction associated with a fluid flowing through that channel, and that channel includes a subchannel that causes the flowing fluid to follow a second direction different than the first direction.

15. The substrate of claim 1, wherein at least one of the first and second channels is curved and includes a plurality of subchannels that induce a radial flow with respect to the curve.

16. The substrate of claim 1, wherein at least one of the first and second channels includes a flow modifier shaped to generate a vortex flow field in a fluid flowing through the channel.

17. The substrate of claim 1, wherein at least one of the first and second channels includes a flow modifier shaped to generate turbulence in a fluid flowing through the channel.

18. The substrate of claim 1, wherein:
   the substrate includes an interior volume in fluid communication with the inlet;
   an exterior of the substrate is in fluid communication with the outlet; and the inlet and outlet are in fluid communication via the porous wall between the first and second channels.

19. The substrate of claim 18, wherein at least one of the first and second channels includes a helical shape and a plurality of subchannels the subchannels inducing a radial flow direction with respect to the helical shape.

20. A substrate for use in a reactor having an inlet and an outlet, a line from the inlet to the outlet defining a flow direction, the substrate comprising:
a first end configured to be in fluid communication with the inlet;
a second end configured to be in fluid communication with the outlet; and
a helical first channel within the substrate and in fluid communication with at least one of the inlet and the outlet, the helical first channel including one or more subchannels that induce a radial component with respect to the helical first channel.

21. The substrate of claim 20, wherein the substrate includes an interior volume, and the first channel includes an opening to at least one of the interior volume and an exterior of the substrate.

22. The substrate of claim 21, wherein the first channel provides for fluid communication between the interior volume and the exterior.

23. The substrate of claim 20, wherein the first channel includes one or more flow modifiers shaped to induce turbulence in a fluid flowing through the first channel.

24. The substrate of claim 20, wherein the first channel includes one or more flow modifiers shaped to induce a vortex flow field in a fluid flowing through the first channel.

25. A substrate for use in a reactor having an inlet and an outlet, a line from the inlet to the outlet defining a flow direction, the substrate comprising:
a first end configured to be in fluid communication with the inlet;
a second end configured to be in fluid communication with the outlet; and
a first channel within the substrate, the first channel in fluid communication with at least one of the inlet and the outlet, the first channel including a plurality of subchannels,
wherein the first channel is in the shape of a ring having an interior and an exterior, and the interior and exterior are in fluid communication via the first channel.

26. The substrate of claim 25, wherein the substrate includes an interior volume, and the first channel includes an opening to at least one of the interior volume and an exterior of the substrate.

27. The substrate of claim 25, wherein a flow field through at least one subchannel is characterized by a primary flow field, and the subchannel includes a flow modifier configured to induce a secondary flow field in the flow of fluid.

28. The substrate of claim 25, wherein the first channel is characterized by a flow direction associated with a fluid flowing through the first channel, and at least one subchannel causes the flowing fluid to follow a second direction different than the first direction.

29. The substrate of claim 25, wherein the first channel includes a flow modifier to induce a vortex flow field in a fluid flowing through the first channel.

30. The substrate of claim 25, wherein the first channel includes a flow modifier configured to induce turbulence in a fluid flowing through the first channel.

31. The substrate of claim 25, wherein the substrate includes an interior volume in fluid communication with an exterior of the substrate via the first channel.

32. The substrate of claim 25, wherein a flow of fluid through the first channel is characterized by a primary flow field, and the first channel includes one or more flow modifiers shaped to induce a secondary flow field in the flow of fluid.

* * * * *